United States Patent
Gabriel et al.

(10) Patent No.: US 7,937,836 B2
(45) Date of Patent: *May 10, 2011

(54) FLUID DELIVERY VALVE SYSTEM AND METHOD OF ASSEMBLING

(75) Inventors: George S. Gabriel, Seaford, DE (US); Neil E. Campbell, Eden, MD (US); Chinsoo Park, Salisbury, MD (US)

(73) Assignee: Hydropac/Lab Products, Inc., Seaford, DE (US)

( * ) Notice: Subject to any disclaimer, the term of this patent is extended or adjusted under 35 U.S.C. 154(b) by 787 days.

This patent is subject to a terminal disclaimer.

(21) Appl. No.: 11/854,043

(22) Filed: Sep. 12, 2007

(65) Prior Publication Data
US 2008/0000079 A1 Jan. 3, 2008

Related U.S. Application Data

(60) Division of application No. 11/267,472, filed on Nov. 4, 2005, now Pat. No. 7,303,713, which is a division of application No. 10/824,224, filed on Apr. 13, 2004, now Pat. No. 6,986,324, which is a continuation-in-part of application No. 10/274,619, filed on Oct. 21, 2002, now Pat. No. 6,941,893.

(60) Provisional application No. 60/346,218, filed on Oct. 19, 2001.

(51) Int. Cl.
*A01K 7/00* (2006.01)
*B21D 51/16* (2006.01)
*B67D 1/00* (2006.01)

(52) U.S. Cl. ............... 29/890.124; 29/890.12; 119/72.5; 119/454; 222/81

(58) Field of Classification Search .............. 29/801, 29/890.12, 890.124; 222/81, 83, 83.5, 108, 222/214; 264/328.8, 645; 119/72.5, 454, 119/456
See application file for complete search history.

(56) References Cited

U.S. PATENT DOCUMENTS
2,001,481 A 5/1935 Abbott
(Continued)

FOREIGN PATENT DOCUMENTS
JP 50-099878 12/1974
(Continued)

OTHER PUBLICATIONS
Shielded Valve: Operational Characteristics. Edstrom Industries, Inc. Jan. 2, 1996.
(Continued)

*Primary Examiner* — David P Bryant
*Assistant Examiner* — Alexander P Taousakis
(74) *Attorney, Agent, or Firm* — Stroock & Stroock & Lavan LLP

(57) ABSTRACT

A method of assembling a valve assembly for delivering a fluid from a fluid bag to an animal caging system for housing an animal can include coupling an upper member having a piercing member to a base having a base fluid channel. The method can also include disposing a stem member at least partially within the base fluid channel and disposing a sealing member in the base fluid channel. The sealing member preferably has a flow aperture and a sealing member bottom surface, and facilitates sealing of the flow apertures when the sealing member bottom surface abuts a top surface of the stem member. The method can further include disposing a spring element within the base fluid channel, wherein a portion of the spring element abuts the lower surface to apply a biasing force to the stem member.

7 Claims, 27 Drawing Sheets

U.S. PATENT DOCUMENTS

| | | | |
|---|---|---|---|
| 2,192,479 A | | 3/1940 | Nissen, Jr. |
| 2,239,104 A | | 4/1941 | Kern |
| 2,333,068 A | | 10/1943 | Zwanzig |
| 2,552,155 A | | 5/1951 | Danielson |
| 2,581,324 A | * | 1/1952 | Hartzell ........................ 169/26 |
| 2,805,794 A | | 9/1957 | Amon |
| 3,100,586 A | | 8/1963 | Haynes et al. |
| 3,358,883 A | * | 12/1967 | Lee ................................ 222/86 |
| 3,482,258 A | | 12/1969 | Steen |
| 3,539,076 A | | 11/1970 | Weiss |
| 3,550,560 A | | 12/1970 | Smith et al. |
| 3,645,234 A | | 2/1972 | Schroer |
| 3,791,590 A | | 2/1974 | Dieter |
| 3,958,535 A | | 5/1976 | Salvia |
| 4,022,159 A | | 5/1977 | Salvia |
| 4,040,389 A | | 8/1977 | Walters |
| 4,099,640 A | | 7/1978 | Nessfield et al. |
| 4,120,420 A | | 10/1978 | Dirksing |
| 4,130,088 A | | 12/1978 | Salvia |
| 4,318,424 A | | 3/1982 | Bajka |
| 4,318,497 A | | 3/1982 | Friedrich |
| 4,341,328 A | | 7/1982 | Redick, Jr. |
| 4,421,253 A | | 12/1983 | Croley |
| 4,697,414 A | | 10/1987 | McCarty |
| 4,723,687 A | | 2/1988 | Kutterer |
| 5,002,202 A | | 3/1991 | Karpisek |
| 5,065,700 A | | 11/1991 | Cross et al. |
| 5,127,550 A | | 7/1992 | Knorr |
| 5,303,751 A | | 4/1994 | Slater et al. |
| 5,307,953 A | | 5/1994 | Regan |
| 5,429,273 A | | 7/1995 | King et al. |
| 5,462,200 A | | 10/1995 | Weiler |
| 5,501,177 A | | 3/1996 | Edstrom et al. |
| 5,501,372 A | * | 3/1996 | Daansen ....................... 222/207 |
| 5,623,969 A | | 4/1997 | Raines |
| 5,643,521 A | | 7/1997 | Nehm |
| 5,680,970 A | | 10/1997 | Smith et al. |
| 5,791,519 A | | 8/1998 | Van Marcke |
| 5,823,144 A | | 10/1998 | Edstrom, Sr. et al. |
| 5,884,810 A | | 3/1999 | Vizcarra et al. |
| 5,895,383 A | | 4/1999 | Niedospial, Jr. |
| 5,924,384 A | | 7/1999 | Deitrich et al. |
| 5,971,207 A | | 10/1999 | McDonough et al. |
| 5,975,359 A | | 11/1999 | Van Marcke |
| 6,026,988 A | | 2/2000 | Teetsel, III et al. |
| 6,082,583 A | | 7/2000 | Bussell et al. |
| 6,098,844 A | | 8/2000 | Nicolle |
| 6,206,242 B1 | | 3/2001 | Amberg et al. |
| 6,210,361 B1 | | 4/2001 | Kamen et al. |
| 6,247,616 B1 | | 6/2001 | Weiler et al. |
| 6,257,171 B1 | | 7/2001 | Rivard |
| 6,339,998 B1 | | 1/2002 | Niki et al. |
| 6,571,738 B2 | | 6/2003 | Rivard |
| 6,941,893 B2 | * | 9/2005 | Gabriel et al. ................ 119/72.5 |
| 6,986,324 B2 | * | 1/2006 | Gabriel et al. ................ 119/456 |
| 7,222,586 B2 | | 5/2007 | Gabriel et al. |
| 7,303,713 B2 | * | 12/2007 | Gabriel et al. ................ 264/255 |
| 7,546,816 B2 | * | 6/2009 | Gabriel et al. ................ 119/456 |

FOREIGN PATENT DOCUMENTS

| | | |
|---|---|---|
| JP | 52-069776 | 10/1976 |
| JP | 54-019521 | 8/1980 |
| JP | 62-199854 | 7/1989 |

OTHER PUBLICATIONS

Office Action dated Nov. 19, 2007 for Japanese Patent Application No. 2003-536145 with English translation.

International Search Report, dated Dec. 15, 2008, for International Application No. PCT/US08/79706.

European Search Report, dated Feb. 3, 2009, for European Application No. 08009683.

\* cited by examiner

FLUID DELIVERY VALVE SYSTEM AND METHOD OF ASSEMBLING

CROSS-REFERENCE TO RELATED APPLICATIONS

This application is a Divisional patent application of pending U.S. patent application Ser. No. 11/267,472, filed Nov. 4, 2005 now U.S. Pat. No. 7,303,713 and entitled "Fluid Delivery Valve System and Method", which is a Divisional patent application of U.S. patent application Ser. No. 10/824,224 entitled "Fluid Delivery Valve System and Method," filed Apr. 13, 2004 and issued as U.S. Pat. No. 6,986,324 on Jan. 17, 2006, which is a Continuation-In-Part of U.S. application Ser. No. 10/274,619 entitled "Fluid Delivery System," filed on Oct. 21, 2002 and issued as U.S. Pat. No. 6,941,893 on Sep. 13, 2005, which claims the benefit of U.S. Provisional Patent Application Ser. No. 60/346,218, filed on Oct. 19, 2001, the contents of all which are incorporated in entirety by reference herein.

BACKGROUND OF THE INVENTION

1. Field of the Invention

The present invention relates generally to fluid delivery systems and in particular to a fluid delivery system and method for caging or storage systems for animals.

2. Description of Related Art

A large number of laboratory animals are used every year in experimental research. These animals range in size from mice to non-human primates. To conduct valid and reliable experiments, researchers must be assured that their animals are protected from pathogens and microbial contaminants that will affect test results and conclusions. Proper housing and management of animal facilities are essential to animal well-being, to the quality of research data and teaching or testing programs in which animals are used, and to the health and safety of personnel.

Ordinarily, animals should have access to potable, uncontaminated drinking water or other needed nutrient containing fluids according to their particular requirements. Water quality and the definition of potable water can vary with locality. Periodic monitoring for pH, hardness, and microbial or chemical contamination might be necessary to ensure that water quality is acceptable, particularly for use in studies in which normal components of water in a given locality can influence the results obtained. Water can be treated or purified to minimize or eliminate contamination when protocols require highly purified water. The selection of water treatments should be carefully considered because many forms of water treatment have the potential to cause physiologic alterations, changes in microflora, or effects on experimental results. For example, chlorination of the water supply can be useful for some species but toxic to others.

Because the conditions of housing and husbandry affect animal and occupational health and safety as well as data variability, and effect an animal's well-being, the present invention relates to providing a non-contaminated, replaceable, disposable source of fluid for laboratory animals in a cage level barrier-type cage or integrated cage and rack system to permit optimum environmental conditions and animal comfort.

Animal suppliers around the world have experienced an unprecedented demand for defined pathogen-free animals, and are now committed to the production and accessibility of such animals to researchers. Likewise, laboratory animal cage manufacturers have developed many caging systems that provide techniques and equipment to insure a pathogen free environment. For example, ventilated cage and rack systems are well known in the art. One such ventilated cage and rack system is disclosed in U.S. Pat. No. 4,989,545, the contents of which are incorporated herein by reference, assigned to Lab Products, Inc., in which an open rack system including a plurality of shelves, each formed as an air plenum, is provided. A ventilation system is connected to the rack system for ventilating each cage in the rack, and the animals therein, thereby eliminating the need for a cage that may be easily contaminated with pathogens, allergens, unwanted pheromones, or other hazardous fumes. It is known to house rats, for example, for study in such a ventilated cage and rack system.

The increasing need for improvement and technological advancement for efficiently, safely housing and maintaining laboratory animals arises mainly from contemporary interests in creating a pathogen-free laboratory animal environment and through the use of immuno-compromised, immuno-deficient, transgenic and induced mutant ("knockout") animals. Transgenic technologies, which are rapidly expanding, provide most of the animal populations for modeling molecular biology applications. Transgenic animals account for the continuous success of modeling mice and rats for human diseases, models of disease treatment and prevention and by advances in knowledge concerning developmental genetics. Also, the development of new immuno-deficient models has seen tremendous advances in recent years due to the creation of gene-targeted models using knockout technology. Thus, the desire for an uncontaminated cage environment and the increasing use of immuno-compromised animals (i.e., SCID mice) has greatly increased the need for pathogen free sources of food and water. One of the chief means through which pathogens can be introduced into an otherwise isolated animal caging environment is through the contaminated food or water sources provided to the animal(s).

Accordingly, the need exists to improve and better maintain the health of research animals through improving both specialized caging equipment and the water delivery apparatus for a given cage. Related caging system technologies for water or fluid delivery have certain deficiencies such as risks of contamination, bio-containment requirements, DNA hazardous issues, gene transfer technologies disease induction, allergen exposure in the workplace and animal welfare issues.

Presently, laboratories or other facilities provide fluid to their animals in bottles or other containers that must be removed from the cage, disassembled, cleaned, sterilized, reassembled, and placed back in the cage. Additionally, a large quantity of fluid bottles or containers must be stored by the labs based on the possible future needs of the lab, and/or differing requirements based on the types of animals studied. This massive storage, cleaning and sterilization effort, typically performed on a weekly basis, requires large amounts of time, space and human resources to perform these repetitive, and often tedious tasks.

As such, a need exists for an improved system for delivering fluid to laboratory animals living in cage level barrier-type rack and cage systems.

SUMMARY OF THE INVENTION

The present invention satisfies this need, briefly stated, in accordance with an embodiment of the invention, a fluid delivery system for delivering a fluid to an animal caging system for housing an animal is described. The fluid delivery system may comprise a fluid delivery valve assembly adapted to be coupled to a fluid bag holding a fluid. By advantageously using sanitized fluid bags, that may be disposable, the invention may minimize the need for the use of fluid bottles that typically must be removed from cages, cleaned, and sanitized on a frequent basis.

The delivery system may be utilized in a single cage or in multiples cages integrated into ventilated cage and rack systems known in the art. An embodiment of the invention described herein provides for a fluid delivery system for delivering a fluid from a fluid bag to an animal caging system for housing an animal and may comprise a fluid delivery valve assembly, wherein the fluid delivery valve assembly is adapted to be coupled to the fluid bag to facilitate the providing of the fluid to an animal in the caging system. The fluid delivery valve assembly may further comprise an upper member having a piercing member and a connecting member, the upper member having a fluid channel defined therethrough, a base having a flange member and a base fluid channel defined therethrough, wherein the base is designed to be matingly coupled to the upper member. The fluid delivery valve assembly may further comprise a spring element disposed within the base fluid channel and a stem member disposed in part within the base fluid channel, wherein a portion of the spring element abuts the stem member to apply a biasing force.

Another embodiment is directed to a method of forming a valve assembly for delivering a fluid from a fluid bag to an animal caging system for housing an animal can include forming, in an injection molding machine, an upper member having a piercing member and a connecting member. The upper member has a fluid channel defined therethrough; and forms, in an injection molding machine, a base having a flange member and a base fluid channel defined therethrough. The base is designed to be matingly coupled to the upper member. The method can further include forming, in an injection molding machine, a stem member designed and dimensioned to be disposed in part within the base fluid channel. The stem member has an actuation portion extending through a spring element. The stem member has a top portion having a lower surface.

Still other objects and advantages of the invention will in part be obvious and will in part be apparent from the specification.

Other features and advantages of this invention will become apparent in the following detailed description of exemplary embodiments of this invention with reference to the accompanying drawings.

BRIEF DESCRIPTION OF THE DRAWINGS

In the drawing figures, which are merely illustrative, and wherein like reference characters denote similar elements throughout the several views.

DETAILED DESCRIPTION OF EXEMPLARY EMBODIMENTS

Figure 1:
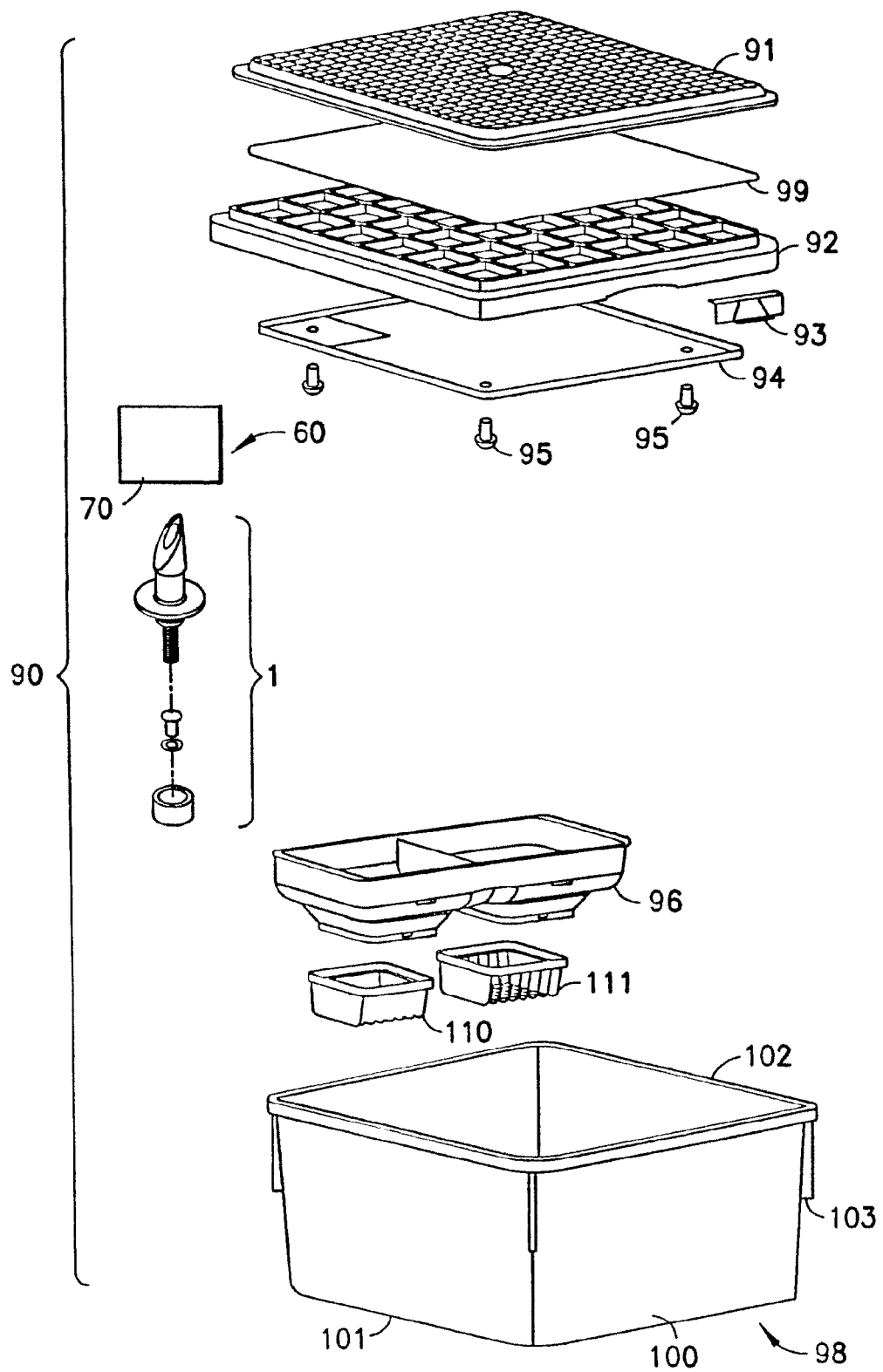
FIG. 1 is an exploded perspective view of a fluid delivery system incorporated into an animal cage assembly.
Figure 2:
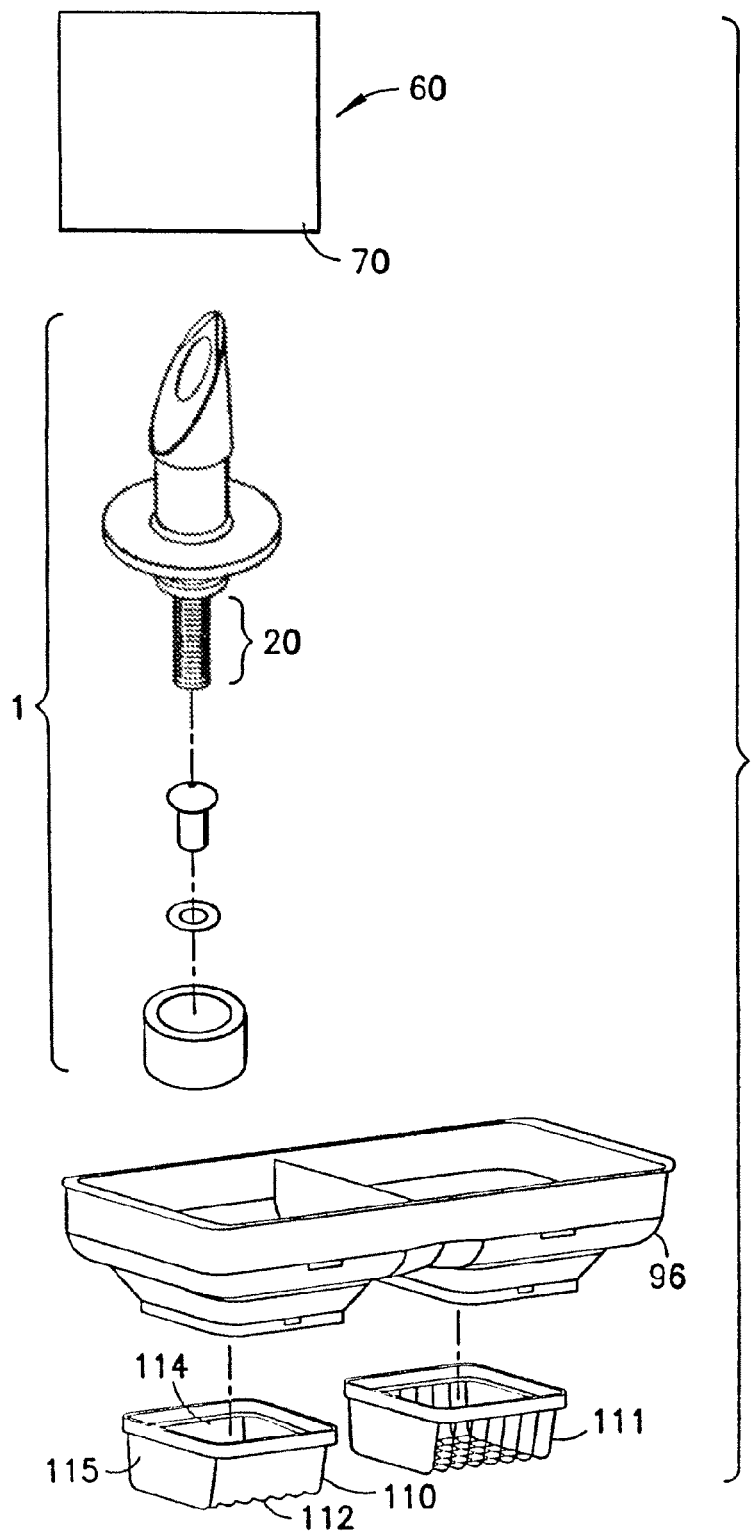
FIG. 2 is an exploded perspective view of a fluid delivery system and diet delivery system in accordance with the present invention.

Reference is made to FIGS. 1 and 2, wherein an animal cage assembly 90, which incorporates fluid delivery valve assembly 1, is shown. Cage assembly 90 incorporates a filter retainer 91, a filter frame 92, a filter top lock 93, a chew shield 94, a plurality of snap rivets 95, a fluid bag 60 containing fluid 70, a fluid delivery valve assembly 1, a diet delivery system 96 providing support member 50, a chow receptacle 111, a fluid bag receptacle 110, and a cage body 98. Cage body 98 comprises a box-like animal cage with a combination diet delivery system 96 capable of providing both food and fluid to animals within cage assembly 90. A filter 99 is also generally provided with cage assembly 90 sandwiched between filter retainer 91 and filter frame 92. Cage body 98 is formed with integral side walls 100, a bottom wall or floor 101 and an open top end. The open top of cage body 98 is bordered by peripheral lip 102, which extends continuously there around. Cage body 98 may also include a plurality of corner stacking tabs 103 for facilitating stacking and nesting of a plurality of cage bodies 98.

Figure 3:
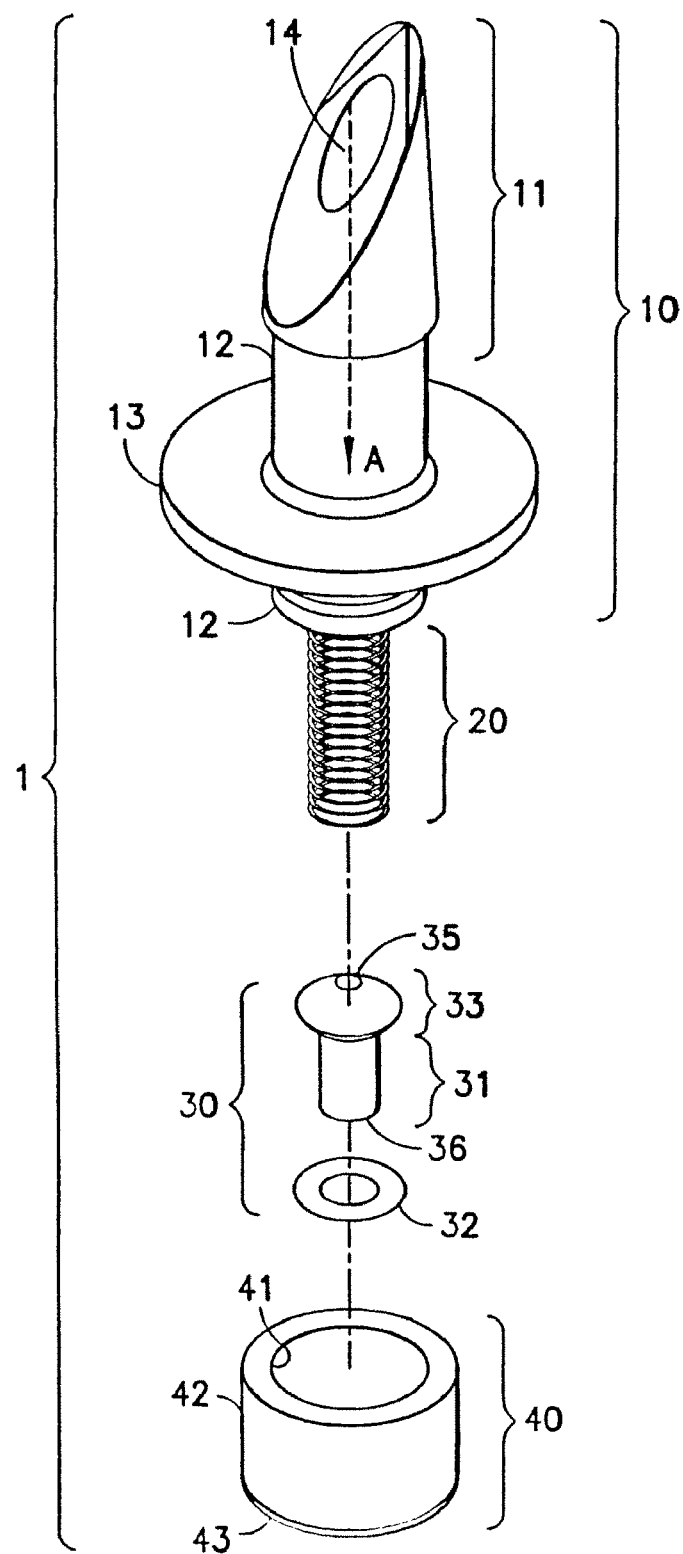
FIG. 3 is an exploded perspective view of an embodiment of a fluid delivery valve assembly in accordance with the present invention.
Figure 4:
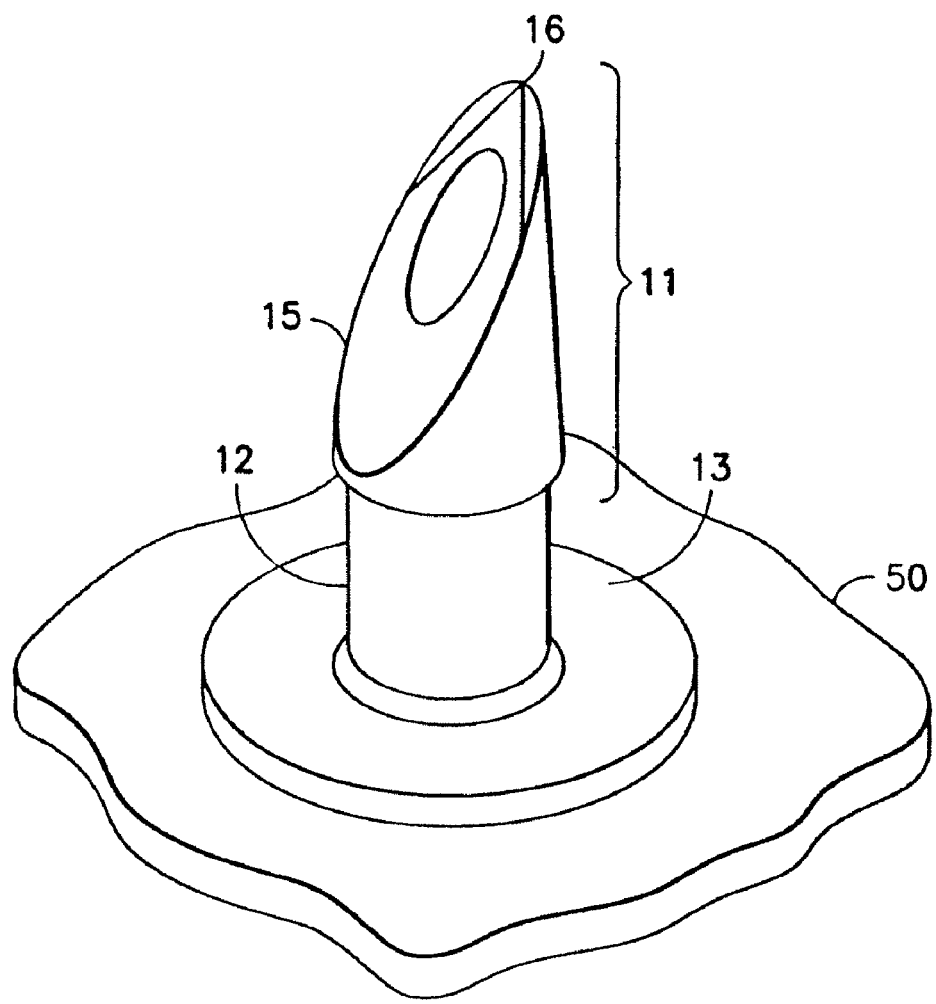
FIG. 4 is a side view of the fluid delivery valve assembly of FIG. 3.
Figure 5:
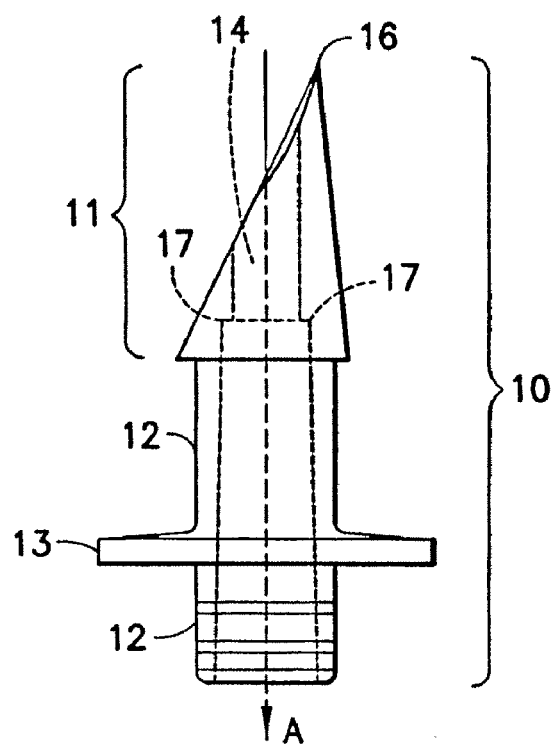
FIG. 5 is a side cutaway view of the upper member of the fluid delivery valve assembly of FIG. 3.

Reference is made to FIGS. 3-5 wherein fluid delivery valve assembly 1 is depicted. Fluid delivery valve assembly 1 includes an upper member 10, a spring element 20, a trigger assembly 30, and a cup element 40 for use in animal cage 90. Water delivery system 1 is held in place in animal cage 90 by support element 50. Support element 50 extends from diet delivery system 96 and forms a floor for fluid bag receptacle 110. Alternatively, water delivery system 1 may be molded into diet delivery system 96.

As shown in FIGS. 4 and 5, upper member 10 includes piercing member 11, core member 12 and flange member 13. Upper member 10 also defines fluid channel 14. Arrow "A" defines the flow of fluid through fluid delivery valve assembly 1 to trigger assembly 30 where fluid flow can be actuated by an animal in animal cage 90. Piercing member 11 has a beveled tip 15 at its upper end, the upper edge of which presents a sharp piercing edge 16 that can come in contact and pierce fluid bag 60, releasing fluid 70 in fluid bag 60 through fluid channel 14. Flange member 13 extends from core member 12. In a preferred embodiment, flange member 13 is circular in dimension. However, it will be readily understood by one of ordinary skill in the art that flange member 13 may be any shape desired, provided however, that at least a portion of flange member 13 is wider in diameter than fluid channel 14 of core member 12. As shown in FIG. 3, spring element 20 may be a tightly wound coiled member which rests atop tip 35 of upper end 33 of stem 31 and enters upper member 10 through fluid channel 14. As shown in FIG. 5, fluid channel 14 is dimensioned such that its upper extent within piercing member 11 is narrowed at position 17 such that it prevents spring element 20 from exiting fluid channel 14 through piercing member 11.

Figure 6:
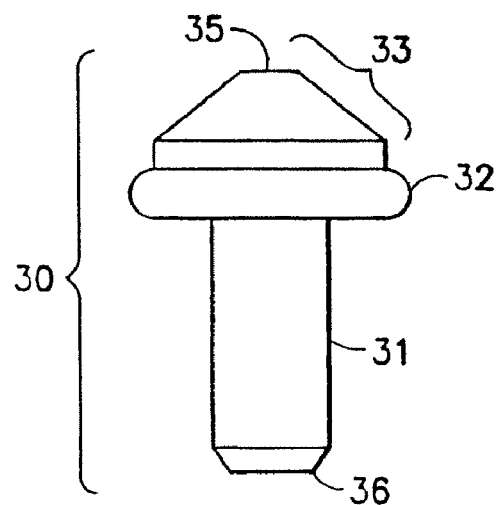
FIG. 6 is a perspective view of trigger assembly of a fluid delivery valve assembly in accordance with the present invention.

Reference is made to FIG. 6, wherein trigger assembly 30 is depicted. Trigger assembly 30 includes a stem 31, inserted through sealing member 32. Stem 31 having an upper end 33 and a lower end 36. Lower end 36 of stem 31 is substantially flat. Upper end 33 of stem 31 is generally conical in shape, although other shapes may be used. Sealing member 32 fits tightly around stem 31 thereby allowing limited movement around stem 31. Sealing member 32 is dimensioned such that the base of the conical portion of upper end 33 rests on it. Sealing member 32 is formed of a resilient material, such as rubber, silicone rubber, or any other pliant malleable material. In a preferred embodiment, sealing member 32 is made of a material that is not deleterious to mammals.

Figure 7:
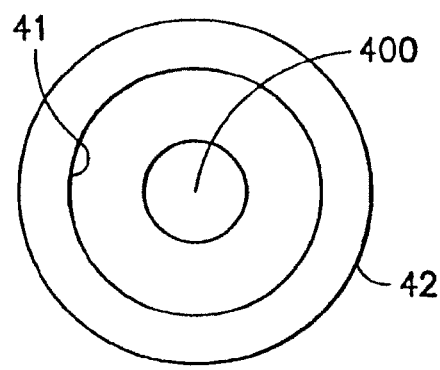
FIG. 7 is a top plain view of cup element in accordance with the present invention.
Figure 8:
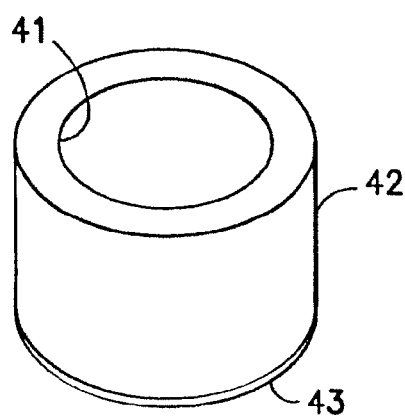
FIG. 8 is a perspective view of the cup element in accordance with the present invention.
Figure 9:
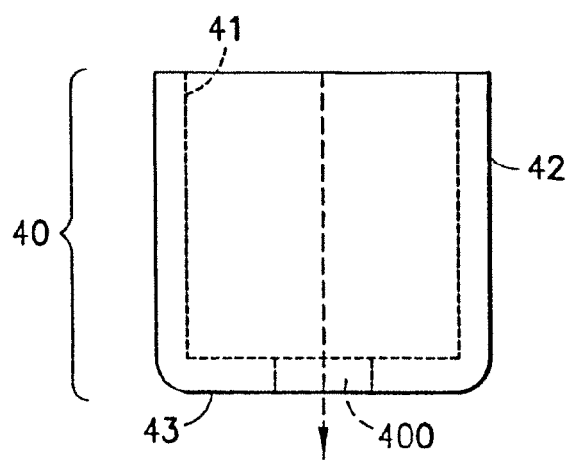
FIG. 9 is a cutaway view of cup element in accordance with the present invention.

Cup element 40 is depicted in FIGS. 7-9. Cup element 40 has a base 43, an inner surface 41, and an outer surface 42. Base 43 also defines actuation channel 400. Lower end 36 of stem 31 of trigger assembly 30 extends through actuation channel 400 towards the interior of animal cage 90. Fluid channel 14 extends from piercing edge 16 through piercing member 11, core member 12 and spring element 20. Fluid channel 14 terminates at the bottom wall of cup element 40. Trigger assembly 30 extends through actuation channel 400. Cup element 40 has friction fit with core member 12 of upper member 10 directly below flange member 13.

Figure 10:
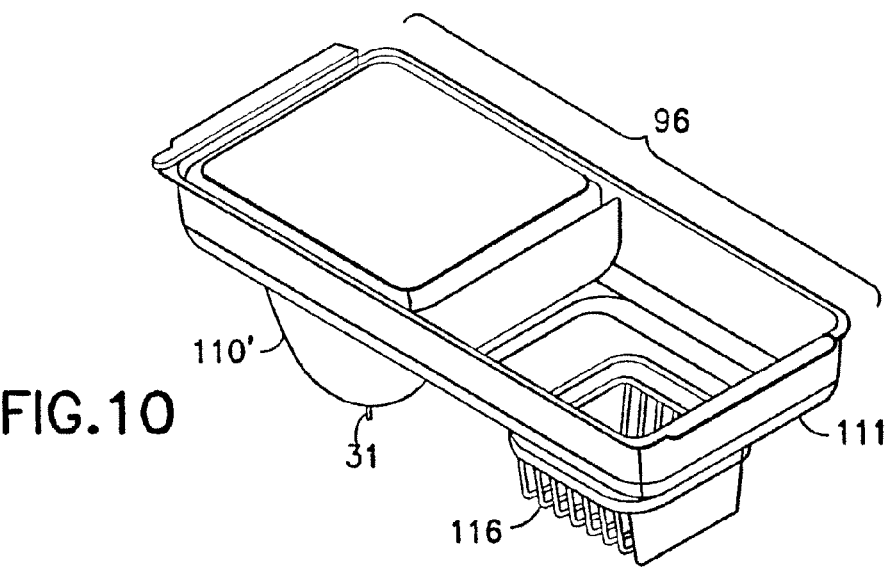
FIG. 10 is a perspective view of a diet delivery system.
Figure 11:
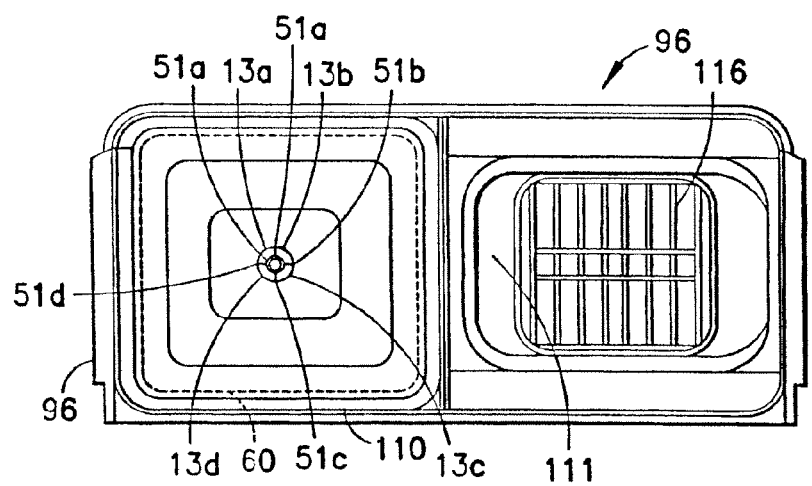
FIG. 11 is a top plan view of diet delivery system incorporating a fluid delivery system in accordance with the present invention.
Figure 12:
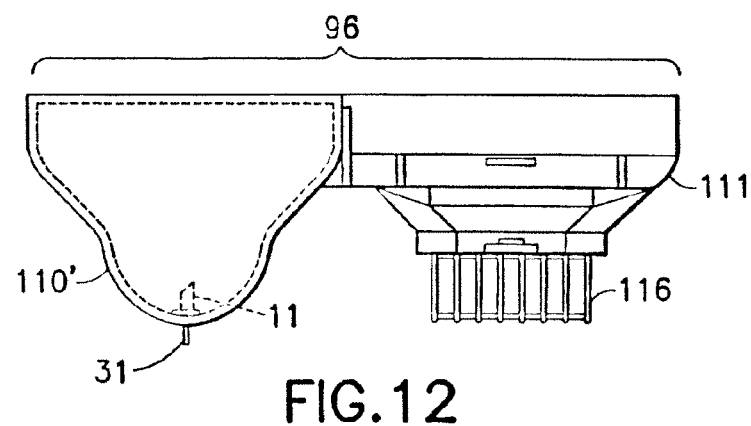
FIG. 12 is a front cutaway view of diet delivery system.

Diet delivery system 96, which houses fluid bag receptacle 110 and chow receptacle 111 is shown in FIGS. 10-12. As shown in FIG. 11, fluid bag receptacle 110 holds fluid bag 60 containing fluid 70. Fluid delivery valve assembly 1 is held securely in receptacle base 112 of fluid bag receptacle 110 by the interconnection between flange members 13a, 13b, 13c and 13d and locking members 51a, 51b, 51c and 51d. Piercing edge 16 of fluid delivery valve assembly 1 punctures fluid bag 60. As shown in FIGS. 11 and 12, chow receptacle 111 of diet delivery system 96 holds wire food holder element 116. A further embodiment of the present invention in shown in FIGS. 10 and 12, wherein fluid bag receptacle 110 may be molded 110' in order to facilitate the emptying of fluid 70 contained in fluid bag 60 by fluid delivery valve assembly 1 and to prevent the animal from gaining purchase on the fluid bag receptacle. In an alternate embodiment, fluid bag 60 is tapered or dimensioned so as to facilitate the emptying of fluid bag 60 by fluid delivery valve assembly 1. Fluid bag 60 may be made replaceable or disposable and thus may be manufactured singly in any quantity according to the needs of a user.

Fluid delivery valve assembly 1 may be used to deliver the contents of fluid bag 60 to an animal in cage assembly 90. Fluid 70 in fluid bag 60 may include water, distilled water, water supplemented with various vitamins, minerals, medications such as antibiotics or anti-fungal agents, and/or other nutrients, or any fluid which is ingestible by a caged animal. Fluid 70 in fluid bag 60 is delivered to an animal in cage assembly 90 in a sterilized or sanitized condition so as to protect any animals in cage assembly 90 from contagion. Fluid bag 60 may be formed in any desirable shape or volume. In a preferred embodiment, fluid bag 60 is formed to fit fluid bag receptacle 110.

Figure 13:
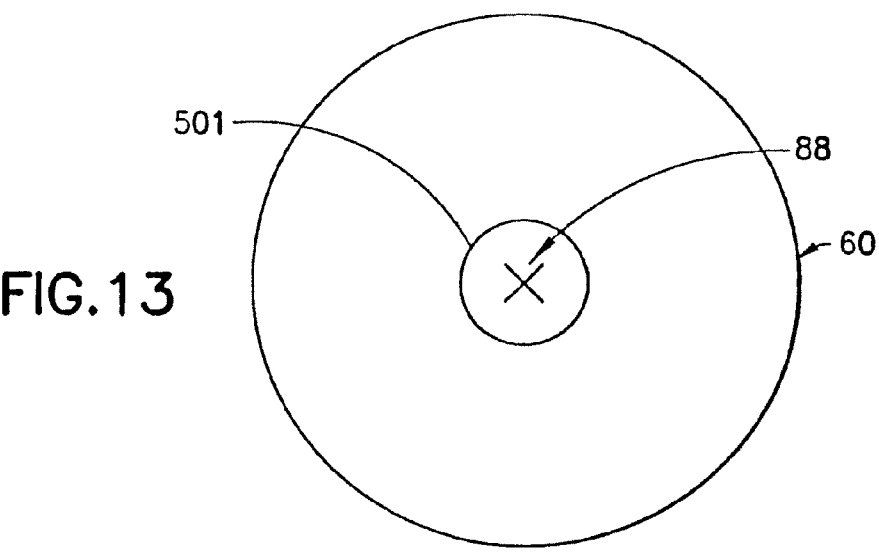
FIG. 13 is a bottom view of a fluid bag in accordance with the present invention.
Figure 14:
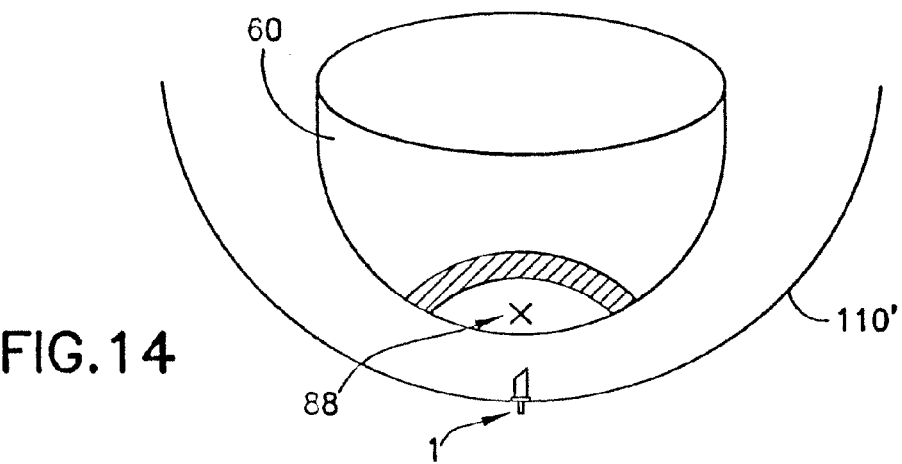
FIG. 14 is a perspective view of a fluid bag and a fluid diet component with a fluid delivery system in accordance with the present invention.
Figure 15:
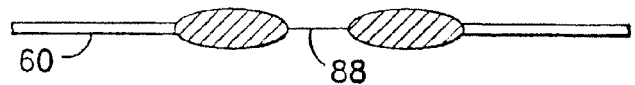
FIG. 15 is a cutaway view of a fluid bag in accordance with the present invention.

Also, it should be clear that fluid bag 60 does not have to consist of a flexible material but that part thereof may be made of a rigid material. In an embodiment of the present invention, fluid bag 60 would consist of one or more layers, which would tear upon insertion of piercing member 11. Alternatively, flexible, stretchable, resilient plastic stickers 501 may be provided which can be adhered to the bag to prevent tearing thereof and to form a seal about the inserted piercing member 11. In addition, as depicted in FIGS. 13-15, fluid bag 60 could be made of a thinner plastic or inverted in the region where piercing edge 16 will penetrate fluid bag 60, thereby allowing the end user to readily identify where fluid bag 60 should be punctured and helping fluid bag 60 nest within fluid bag receptacle 110. In a further embodiment of the present invention, fluid bag 60 could be made of a resilient plastic or polymer material such that when piercing edge 16 penetrates fluid bag 60 at location 88, fluid bag 60 adheres to piercing member 16 so as to stop fluid 70 from leaking out of fluid bag 60. Fluid bag 60 may be constructed out of any material which is capable of being punctured by piercing member 16 and which is capable of holding fluid in a sterilized condition. In an embodiment of the invention, fluid bag 60 is plastic or any other flexible material capable of containing a fluid to be delivered to one or more laboratory animals. In a further embodiment of the present invention, fluid delivery valve assembly 1, upper member 10, fluid bag 60 and the contents thereof, fluid 70, are capable of being sterilized by one or more of an assortment of different means including but not being limited to: ultraviolet light, irradiation, chemical treatment, reverse osmosis, gas sterilization, steam sterilization, filtration, autoclave, and/or distillation. Each of the elements of the current invention, fluid delivery valve assembly 1, fluid bag 60 and fluid 70, can be sterilized or sanitized alone or in combination with each other. Fluid 70 of fluid bag 60 may be sterilized either before or after fluid bag 60 is sealed.

In one embodiment providing a method of sterilization for the contents of fluid bag 60, a chemical compound capable of sterilizing the fluid 70, and known in the art, is put inside fluid bag 60 with fluid 70 prior to fluid bag 60 being sealed. Thereafter the compound sterilizes fluid 70 such that it can be delivered to an animal and consumed by that animal without harm. Other methods of sterilization are discussed below.

In an embodiment of the invention, leak preventing member 501 is affixed or formed to upper member 10 and prevents a loss of fluid 70 from fluid bag 60 after puncture by piercing member 11.

As shown in FIG. 14, piercing member 11 may be rigidly fixed to support element 50 of fluid bag receptacle 110 (see FIGS. 1 and 4), in particular in the support for the bag having its point directed upwards so that piercing member 11 is automatically inserted into fluid bag 60 at location 88 when placing fluid bag 60 onto support element 50 or into fluid bag receptacle 110'.

In one embodiment of the present invention, fluid bag 60 is placed in fluid bag receptacle 110 of animal cage 90. Fluid bag receptacle 110 has a base 112, an inner surface 114 and an outer surface 115. Receptacle base 112 also defines actuation channel 400. When fluid delivery valve assembly 1 is used in conjunction with animal cage 90, stem 31 of trigger assembly 30 extends through cup 40 towards the interior of animal cage 90. In another embodiment, that portion of receptacle base 112 which encircles actuation channel 400 may include one or more locking members 51.

Figure 16:
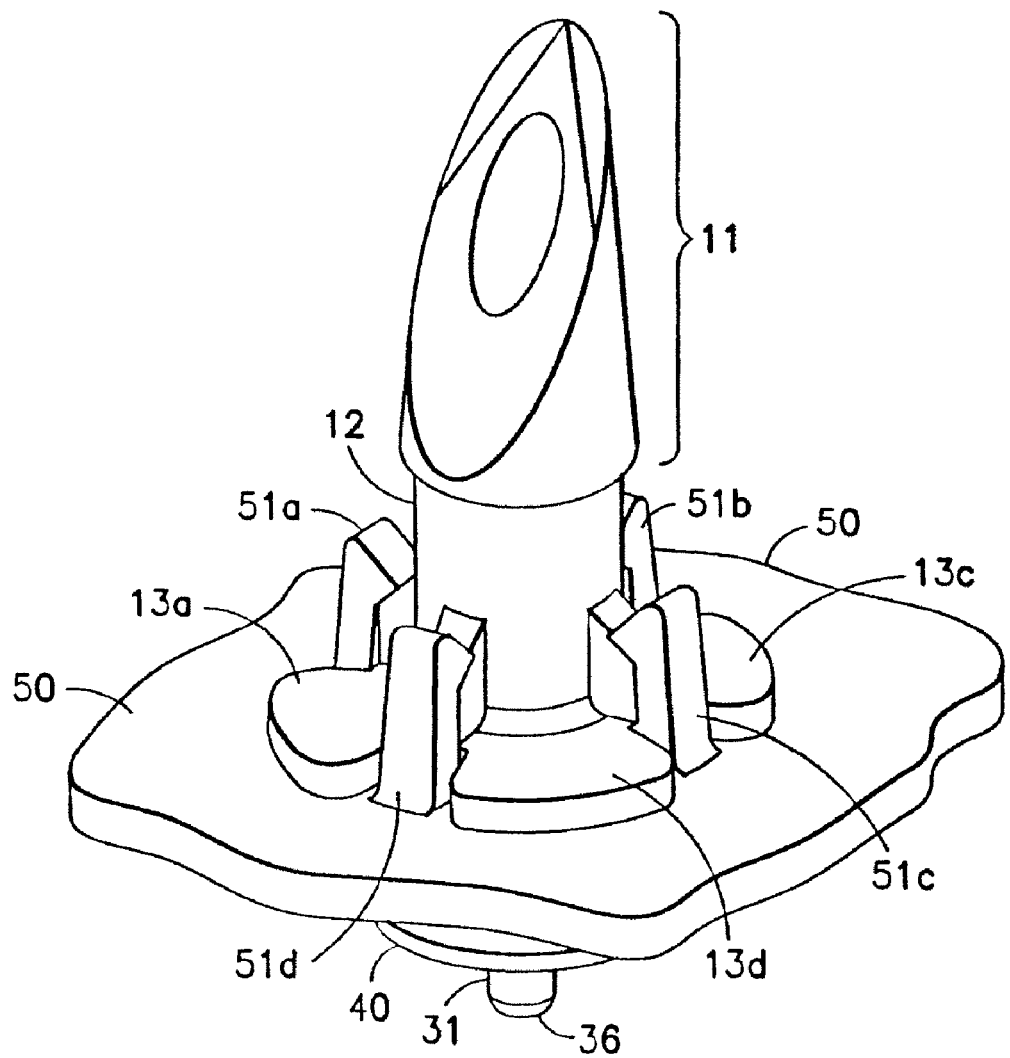
FIG. 16 is a side perspective view of an upper member of a fluid delivery valve assembly including a support in accordance with the present invention.

As shown in FIG. 16, in an alternate embodiment, support member 50 may have four (or some other number of) locking members 51a, 51b, 51c and 51d formed thereon which may be used to secure flange members 13a, 13b, 13c and 13d to support member 50. It will be readily understood by one of ordinary skill in the art that flange members 13a, 13b, 13c and 13d may vary in shape, provided however, that flange members 13a, 13b, 13c and 13d are secured in fluid receptacle base 112 or onto support member 50 by its locking members 51a, 51b, 51c and 51d. In FIG. 16, locking members 51a, 51b, 51c and 51d are shaped like fingers and flange member 13 is divided into four equal pieces, shown as flange members 13a, 13b (not shown), 13c and 13d.

Figure 17:
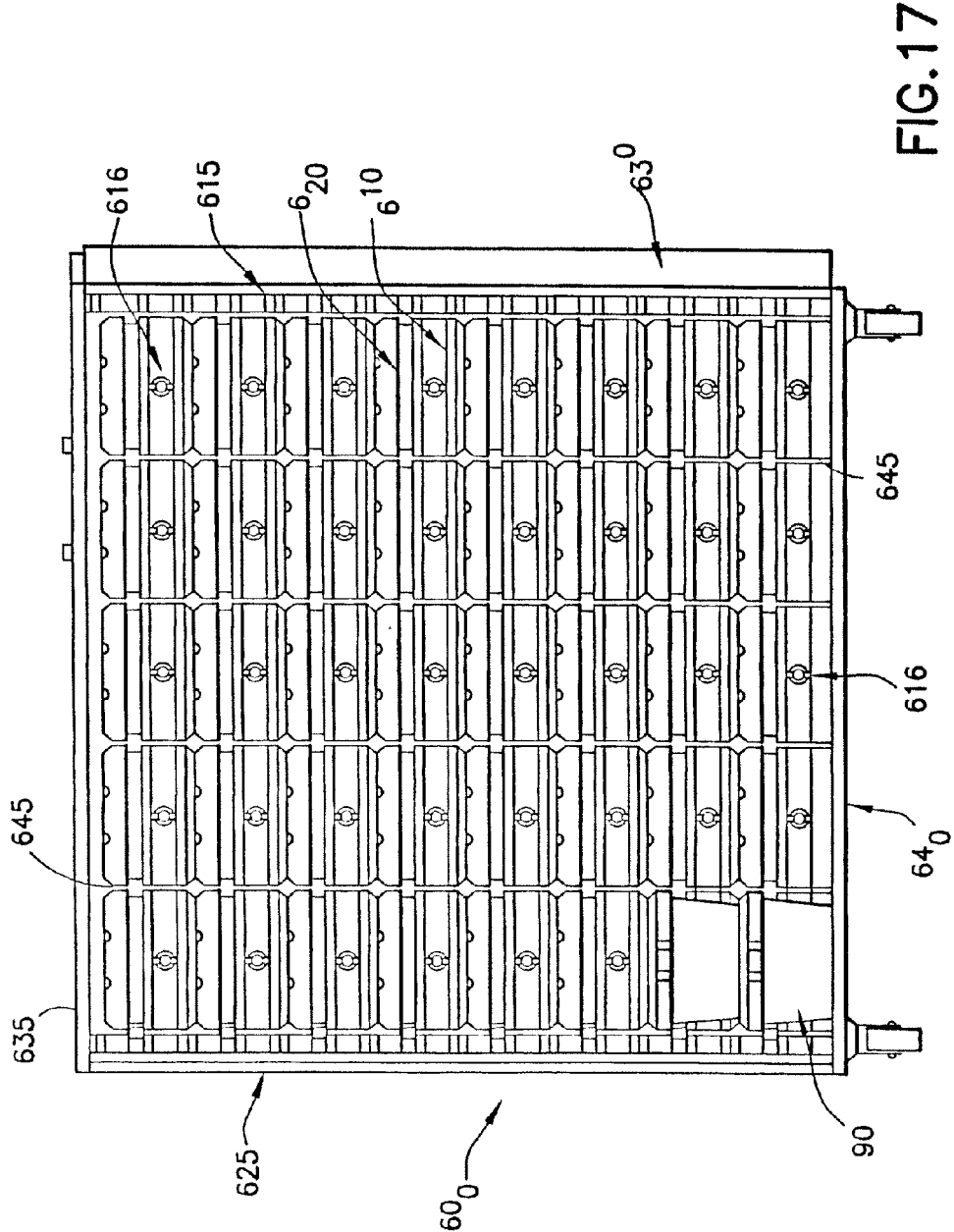
FIG. 17 is a plain side view of a double-sided rack system incorporating an animal cage.

Referring now to FIG. 17, an animal isolation and caging rack system 600 of the invention includes an open rack 615 having a left side wall 625 and a right side wall 630, a plurality of rack coupling stations 616, a top 635, and a bottom 640. A plurality of posts 645 are disposed in parallel between top 635 and bottom 640. Vertical posts 645 are preferably narrow and may comprise walls extending substantially from the front of rack 615 to the rear of rack 615, or may each comprise two vertical members, one at or near the front of rack 615 and the other at or near the rear of rack 615. Animal isolation and caging rack system 600 also includes a plurality of air supply plena 610 and air exhaust plena 620 alternately disposed in parallel between left side wall 625 and right side wall 630 in rack 615.

The above discussed fluid delivery valve assembly 1, while facilitating the providing of fluid to animals, was found to have some deficiencies when used in conjunction with certain rack and cage system configurations. For example, with reference back to FIG. 3, when the stem 31 of the trigger assembly 30 is actuated by an animal, under certain circumstances, the stem may remain stuck in the open position even after the animal discontinues actuating the stem 31. If the stem remains stuck in the open position, fluid may continue to leak into the cage and cage bedding, with the result being a waste of fluid, and the potential for the animal to become hypothermic, or otherwise adversely affected.

One reason for the occurrence of this problem in certain circumstances may be that due to the specific arrangement of the stem 31, sealing member 32 and spring element 20 within the fluid channel 14, when the stem 31 is actuated by an animal, the pivot point of upper end 33 of stem 31 about the bottom of spring element 20 tends not to be either predictable or consistent. Consequently, after actuation by an animal, stem 31, in certain circumstances, will shift position in relation to spring element 20, thus not allowing spring element 20 to bias stem 31 back into the desired closed position.

Figure 18:
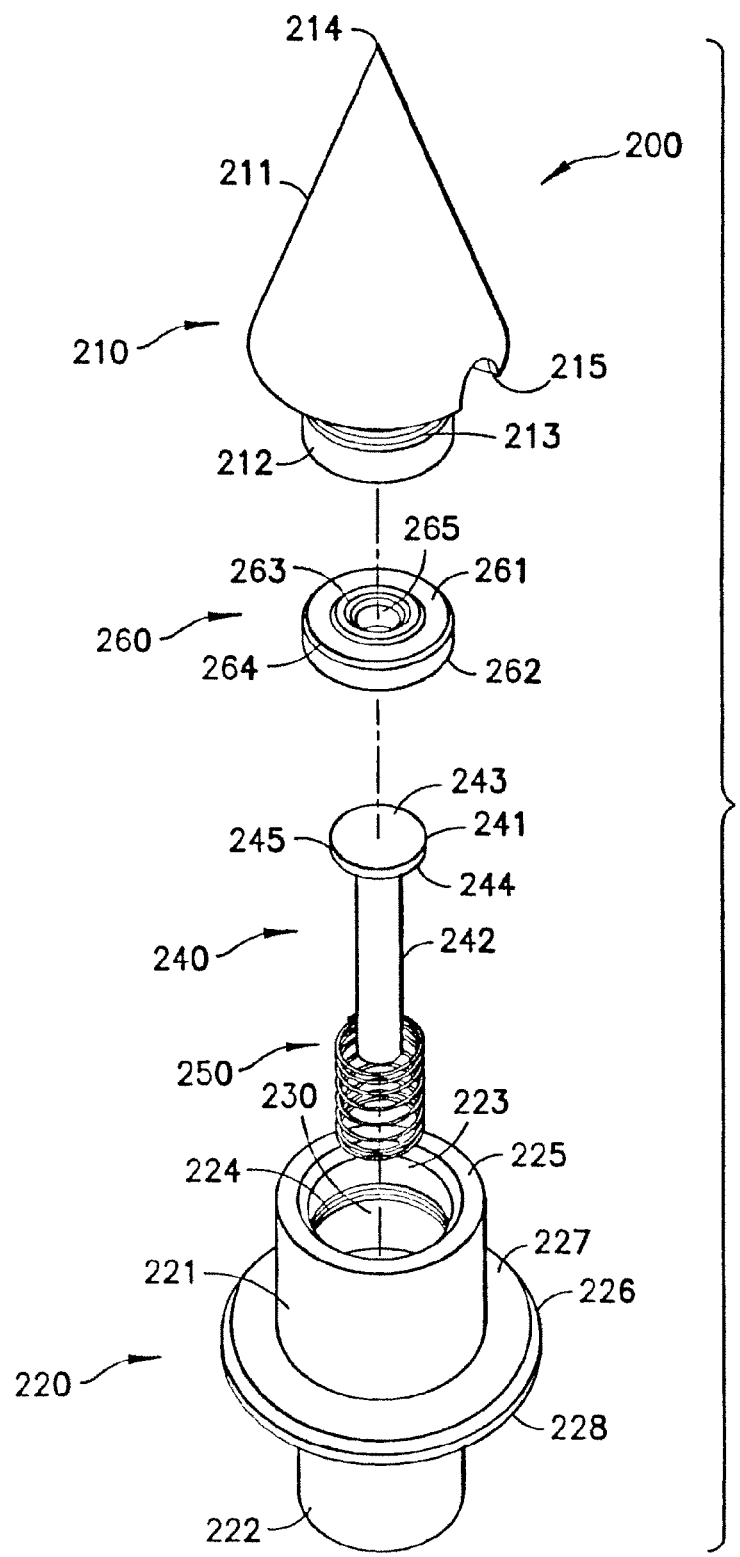
FIG. 18 is an exploded perspective view of an embodiment of a fluid delivery valve assembly in accordance with the present invention.

With reference to FIG. 18, there is shown a fluid delivery valve assembly 200 that overcomes the above-discussed deficiency because, among other modifications, the arrangement of stem member 240, spring member 250, and sealing member 260 is different than that of their respective corresponding parts in fluid delivery valve assembly 1. This arrangement of stem member 240, spring member 250, and sealing member 260, discussed in detail below, provides for a predictable and consistent pivot point for stem member 240, thus facilitating a more consistent return to the closed position in the absence of actuation by an animal.

Thus, fluid delivery valve assembly 200 is different in structure and arrangement to that of fluid delivery valve assembly 1 in several respects. However, in accordance with the present invention, fluid delivery valve assembly 200 may be used in all embodiments discussed above with reference to fluid delivery valve assembly 1. Accordingly, in any embodiment described herein that describes the use of fluid delivery valve assembly 1 in conjunction with, by way of non-limiting example, fluid bag 60, animal isolation and caging rack system 600, and/or diet delivery system 96, fluid delivery valve assembly 200 may be used as well, in accordance with the invention.

With reference again to FIG. 18, there is shown fluid delivery valve assembly 200 having an upper member 210, and a base 220. Fluid delivery valve assembly 200 also includes sealing member 260, stem member 240, and spring member 250.

Upper member 210 is formed with generally conical piercing member 211 having sharp point 214 for piercing fluid bag 60 as described above. One or more fluid apertures 215 are defined in a portion of piercing member 210, to facilitate the flow of fluid 70 from bag 60 into a fluid channel 216 defined within the piercing member 210. Upper member 210 is also formed with connecting member 212, having gripping portion 213 encircling a portion thereof.

Base 220, being generally cylindrical in shape, includes top portion 221 and bottom portion 222, which are separated by flange member 226 which encircles base 220 and extends outwardly therefrom. Flange member 226 may be used to facilitate mounting or positioning of fluid delivery valve assembly 200 as is described above with regard to fluid delivery valve assembly 1. Top portion 221 may have an inner surface 223 with gripping portion 213 disposed thereon.

Upper member 210 is designed and dimensioned to be coupled to base 220 with connecting member 212 being inserted into base top portion 221. The coupling may be facilitated by the frictional interaction of gripping portion 213 of upper member 210 with gripping portion 224 of base 220.

Sealing member 260, stem member 240, and spring member 250 are disposed within base fluid channel 230. Stem member 240 has a top portion 241 that may be generally flat, such that flow aperture 265 of sealing member 260 may be advantageously sealed when a portion of bottom surface 262 of sealing member 260 is contacted by top surface 243 of stem member 240. Actuation portion 242 of stem member 240 extends through spring member 250 and through base fluid channel 230. Spring member 250 serves to bias stem member 240 against sealing member 260 to facilitate control of the flow of fluid, as described above with respect to fluid delivery valve assembly 1.

Figure 19:
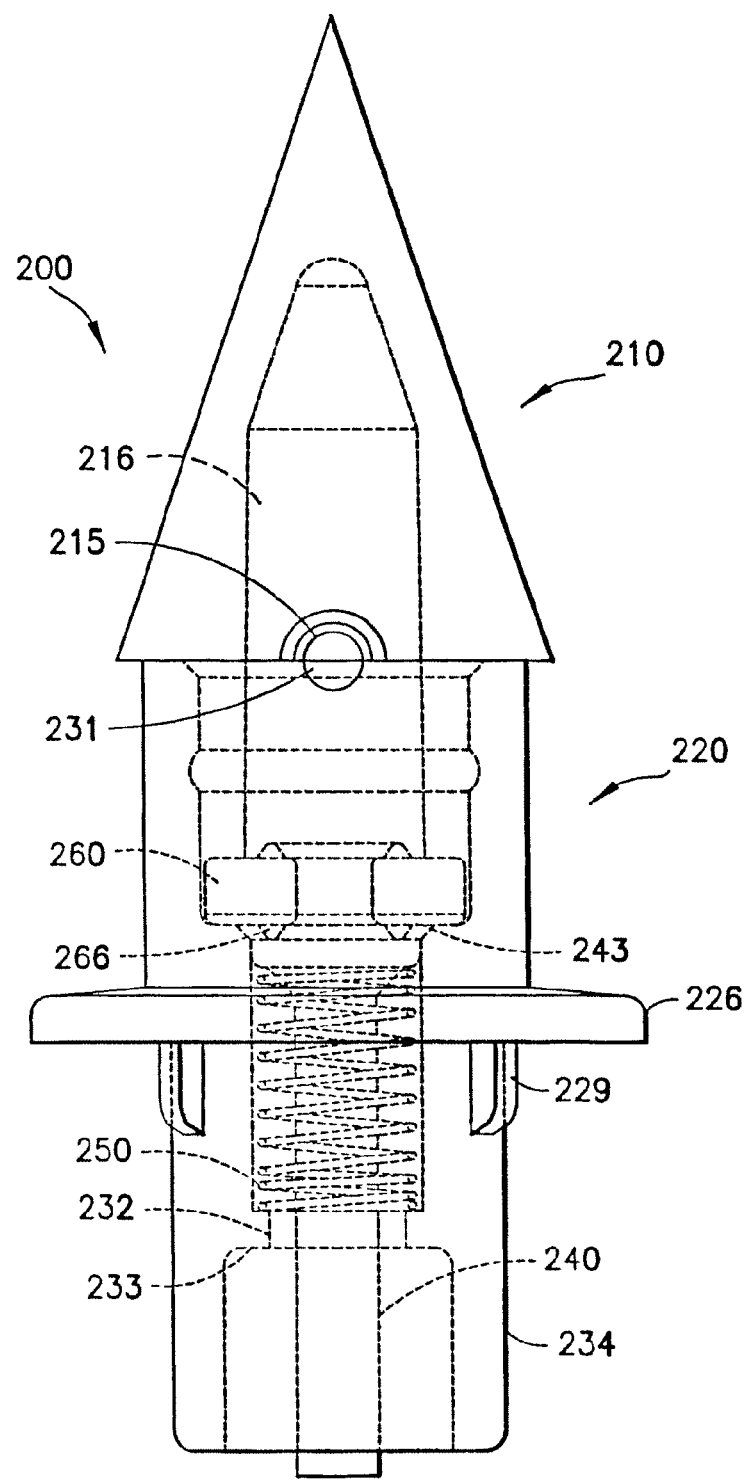
FIG. 19 is a side cutaway view of the fluid delivery valve assembly of FIG. 18.
Figure 20:
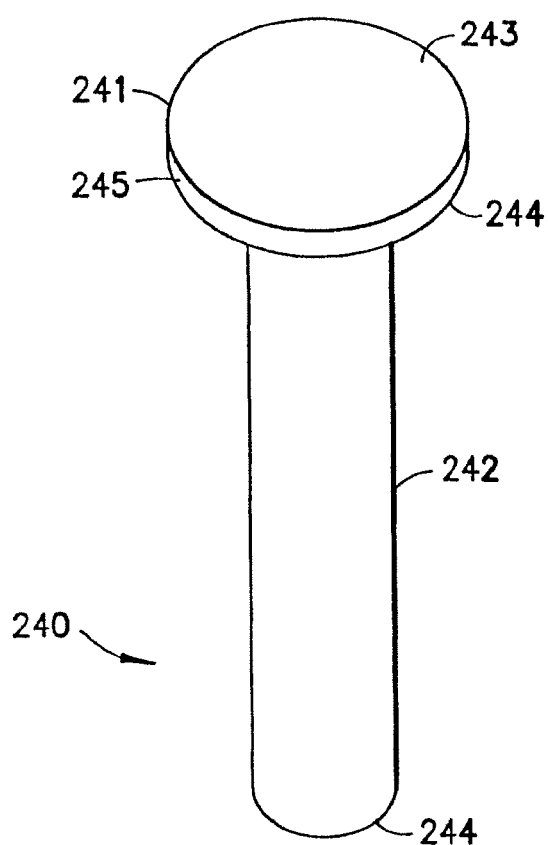
FIG. 20 is a perspective view of the stem of the fluid delivery valve assembly of FIG. 18.

With reference to FIG. 19, spring member 250 is retained within base fluid channel 230 at its bottom end as fluid channel 230 has narrow portion 232, which serves to block spring member 250 from passing through and out of fluid channel 230. The top of spring member 250 abuts the lower surface 244 (see FIG. 20) of stem member 240. Spring member 250 serves to bias stem member 240 in a vertical orientation, thus forming a seal between top surface 243 and sealing member 260. This seal may be facilitated by the use of lower ridge 266 to concentrate the biasing force of spring member 250 to form a seal against stem member 240.

Figure 21:
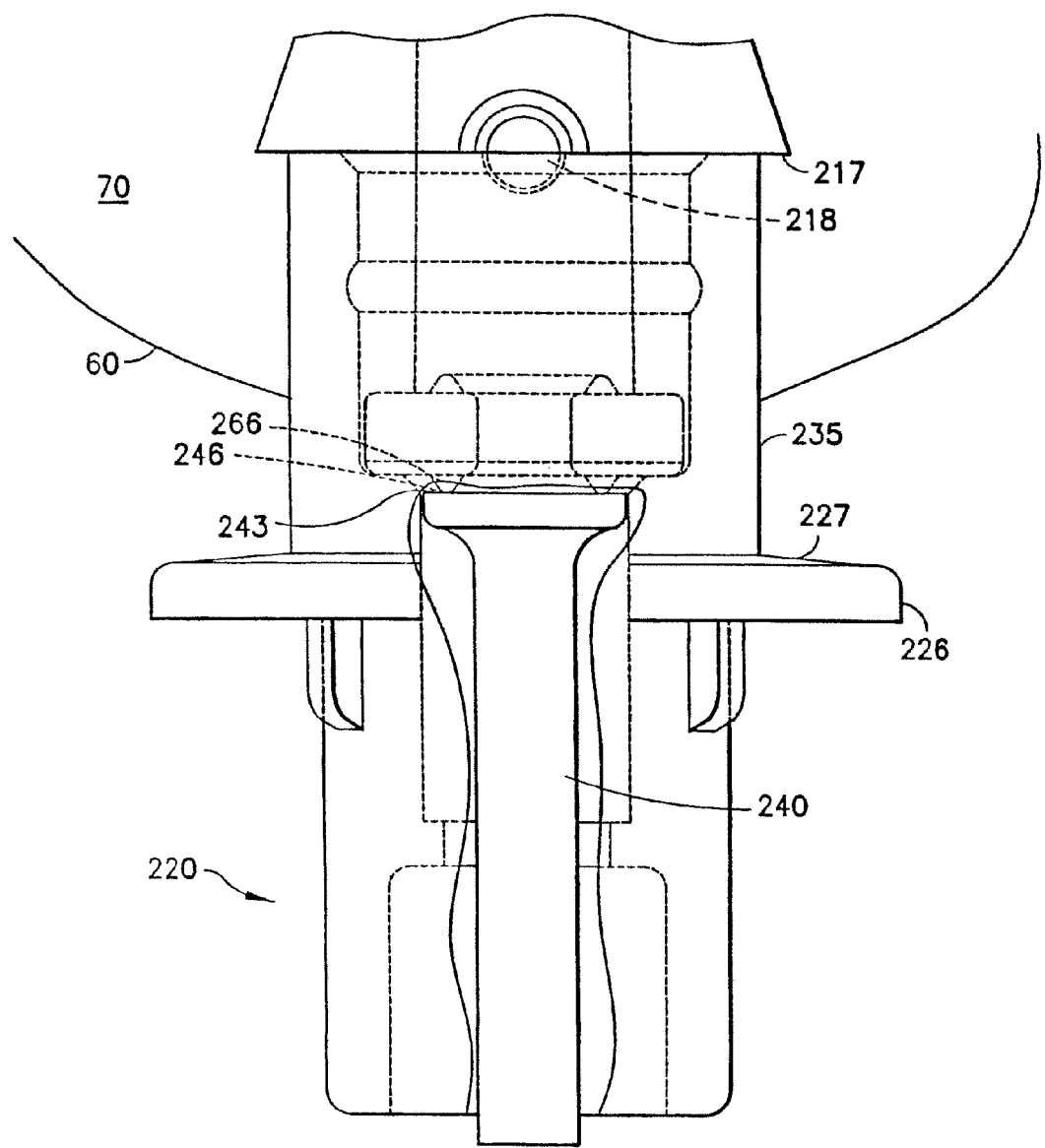
FIG. 21 is a side cutaway view of the fluid delivery valve assembly of FIG. 18, showing the stem in the sealed position.
Figure 22:
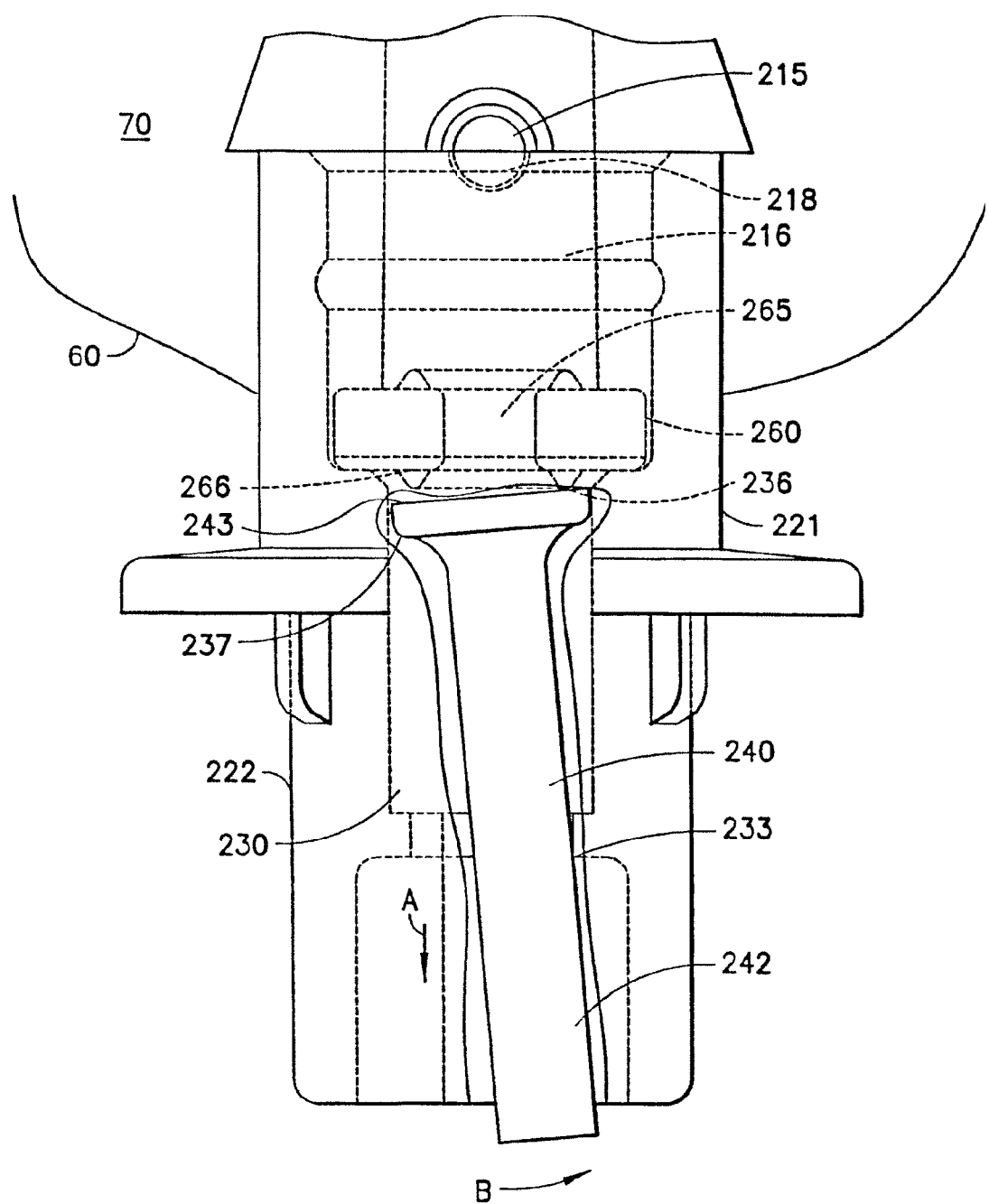
FIG. 22 is a side cutaway view of the fluid delivery valve assembly of FIG. 18, showing the stem in the opened position.

Turning to FIGS. 21 and 22, there is shown the operation of fluid delivery valve assembly 200 when stem member 240 is actuated by an animal. It should be noted that spring member 250 is not shown in FIGS. 21 and 22 for sake of clarity. During actuation of stem member 240 by an animal, however, as discussed above, spring member 250 provides a biasing force to bias stem member 240 toward a generally vertical position.

With reference to FIG. 21, stem member 240 is positioned generally vertically, with top surface 243 of stem member 240 advantageously abutting lower ridge 266 of sealing member 260 at sealing point 246. The use of lower ridge 266 in conjunction with top surface 240 advantageously serves to focus and concentrate the biasing force of spring member 250 to form a seal as discussed above.

Fluid delivery system 200 is shown having been punctured into fluid bag 60 such that fluid 70 may flow from fluid bag 60 into fluid aperture 215 of upper member 210, and in turn flow into fluid channel 216, through flow aperture 265 of sealing member 260, down to sealing point 246. At this point, with stem member 240 in the vertical (sealed) position, flow of the fluid is stopped.

In an embodiment of the invention, bag 60, once punctured by fluid delivery valve assembly 200, should have its outer wall positioned in the range along surface 235 of top portion 201 of base 220 such that it remains disposed in the portion delimited at its upper bounds by bag retention wall 217 and at its lower bounds by flange top surface 227. In an embodiment of the invention, flow aperture 215 and (in some embodiments) aperture portion 218 may be advantageously positioned about an edge of bag retention wall 217.

Turning now to FIG. 22, there is shown stem member 240 positioned as it would be while an animal actuates actuation portion 242 of stem member 240 in a direction B. Of course, one skilled in the art would recognize that the same result would be achieved so long as the stem member is actuated outwardly, out of its resting vertical position. Upon actuation in direction B, stem member 240 pivots about pivot point 236 such that top surface 243 of stem member 240 moves away from the lower ridge 266 of sealing member 260. This movement allows fluid 70 at flow aperture 265 of sealing member 260 to flow down through gap 237, into fluid channel 230, and out to the animal in the general direction A.

Base 220 may be formed with abutment wall 233 disposed in fluid channel 230 such that the maximum travel of stem member 240 is limited such that the flow of fluid 70 is advantageously limited to a desired value. Additionally, stem member 240, base 220, sealing member 250 and spring member 250 may be advantageously designed and dimensioned such that stem member 240 pivots at a consistent and predictable pivot point 236 and will thus not be subject to sticking or jamming in the open position after stem member 240 is released from actuation by the animal. Consequently, the wasting of fluid and the exposure of animals to hypothermia or other problems caused by excessive wetting of the cage and bedding material may be minimized.

Figure 23:
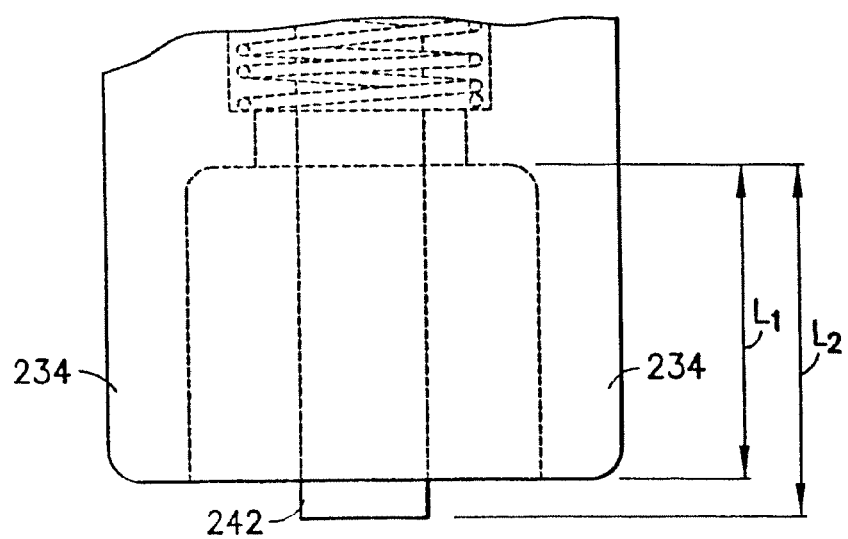
FIG. 23 is a side cutaway view of the fluid delivery valve assembly of FIG. 18, showing the extension portion protecting the stem.

Turning to FIG. 23, embodiments of the invention may be formed with base 220 of fluid delivery valve assembly 200 having extension portion 234. Extension portion 234 may serve, in certain application specific scenarios, to protect the actuation portion 242 of stem member 240 from being accidentally bumped by an animal, as only a portion of actuation portion 242 extends beyond extension portion 234. In an embodiment of the invention, the relative lengths L1 and L2 of extension portion 234 and actuation portion 242 may be adjusted based on the results desired, and the types of animals being fed, as well as other factors.

Figure 24:
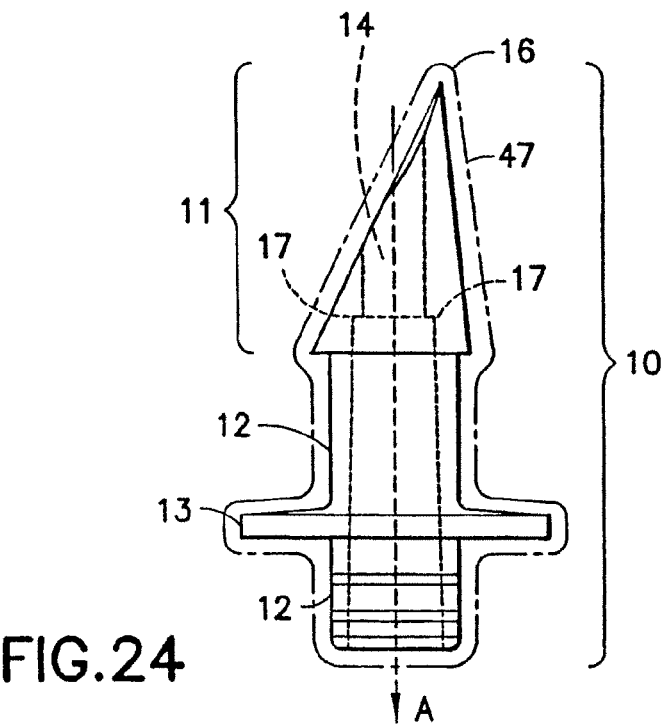
FIG. 24 is a side cutaway view of an upper member of a fluid delivery valve assembly including a wrapper in accordance with the present invention.

Referring to FIG. 24, in an embodiment of the current invention water delivery system 1 (or fluid delivery valve assembly 200) is sterilized and/or autoclaved and maintained in a sterilized state prior to use in a wrapper 47 or other suitable container so as to avoid infecting an animal in animal cage 90 (while, for sake of brevity, the embodiments of the invention discussed below make specific reference only to fluid delivery valve assembly 1, it is to be understood that fluid delivery valve assembly 200 may also be used in all instances as well). When a user determines that a clean water delivery system is needed in conjunction with a fluid bag 60, water delivery system 1 is removed from wrapper 47 in sterile conditions or utilizing non-contaminating methods and inserted into animal cage 90 in fluid bag receptacle 110 (while it is contemplated that all of fluid delivery valve assembly 1 would be contained within wrapper 47, only a portion of fluid delivery valve assembly 1 is illustrated in FIG. 24). Thereafter fluid bag 60 is placed in fluid bag receptacle 110 and is punctured by piercing member 11 such that fluid 70 (i.e., water) is released through fluid channel 14 to an animal in animal cage 90. This procedure insures that sterilized fluid 70 is delivered through an uncontaminated fluid channel and that fluid delivery valve assembly 1 is itself uncontaminated and pathogen free. Additionally, in an embodiment of the invention, fluid delivery valve assembly 1 may be sold and stored in blister packs in groups of various quantities.

Figure 25:
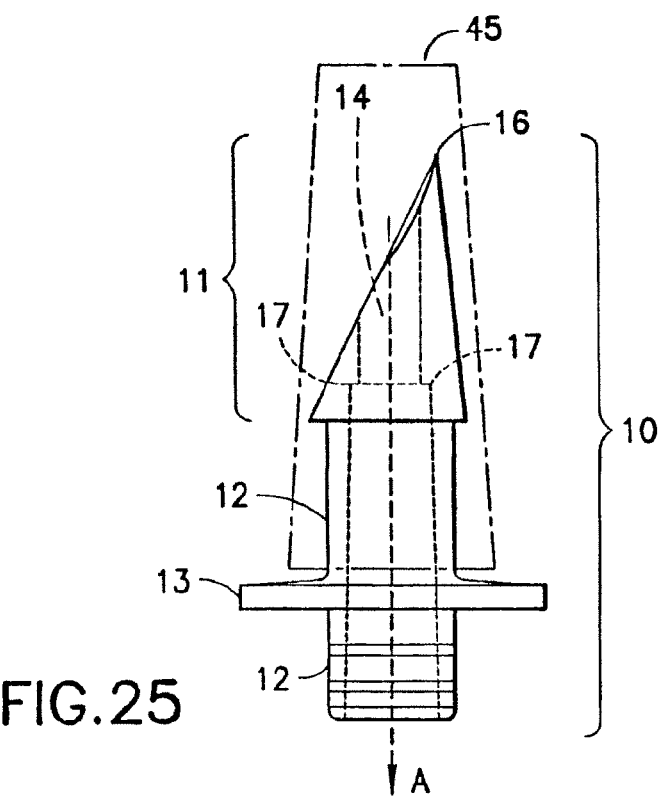
FIG. 25 is a side cutaway view of an upper member of a fluid delivery valve assembly including a disposable cap in accordance with the present invention.

Referring to FIG. 25, in another embodiment of the invention the upper portion of fluid delivery valve assembly 1, including upper member 10 and piercing member 11, is covered with a disposable cap 45, that can be removed when a user wants to use water delivery system 1 to pierce fluid bag 60 and place it in fluid bag receptacle 110 for delivery of a fluid to an animal in animal cage 90. Disposable cap 45 can be made from any suitable material and may be clear, color-coded to indicate the type of fluid in fluid bag 60, clear or opaque. Disposable cap 45 is easily removed from fluid delivery valve assembly 1. While cap 45 would not provide for a sterilized fluid delivery valve assembly 1, it would provide a labeling function, as well as, in an embodiment, provide protection from inadvertent stabbing of a user.

An embodiment of the present invention provides a system and method for fluid delivery to one or more animal cages. The system provided has at least two methods of use, one which includes providing sealed sanitized bags of fluid for use in an animal cage or caging system. The provider provides the pre-packaged and uncontaminated fluid (e.g., water, or fluid with nutrients etc., as needed by an animal) for use preferably by delivering sanitized, fluid-filled, bags to a site designated by a user. Alternatively, the provider may locate a sealing apparatus, material for making the fluid bags and fluid supply at a location designated by the user. Thereafter, the provider will assemble, fill and seal the appropriate number of fluid bags for a user at the designated location. In a second method the provider provides a sealing apparatus and the material for making the fluid bags to a user. In this second method the provider may also supply any appropriate fluid to the user at a location designated by the user. The user thereafter assembles, fills and seals the fluid bags for use in the fluid delivery system of the invention as appropriate.

Figure 26:
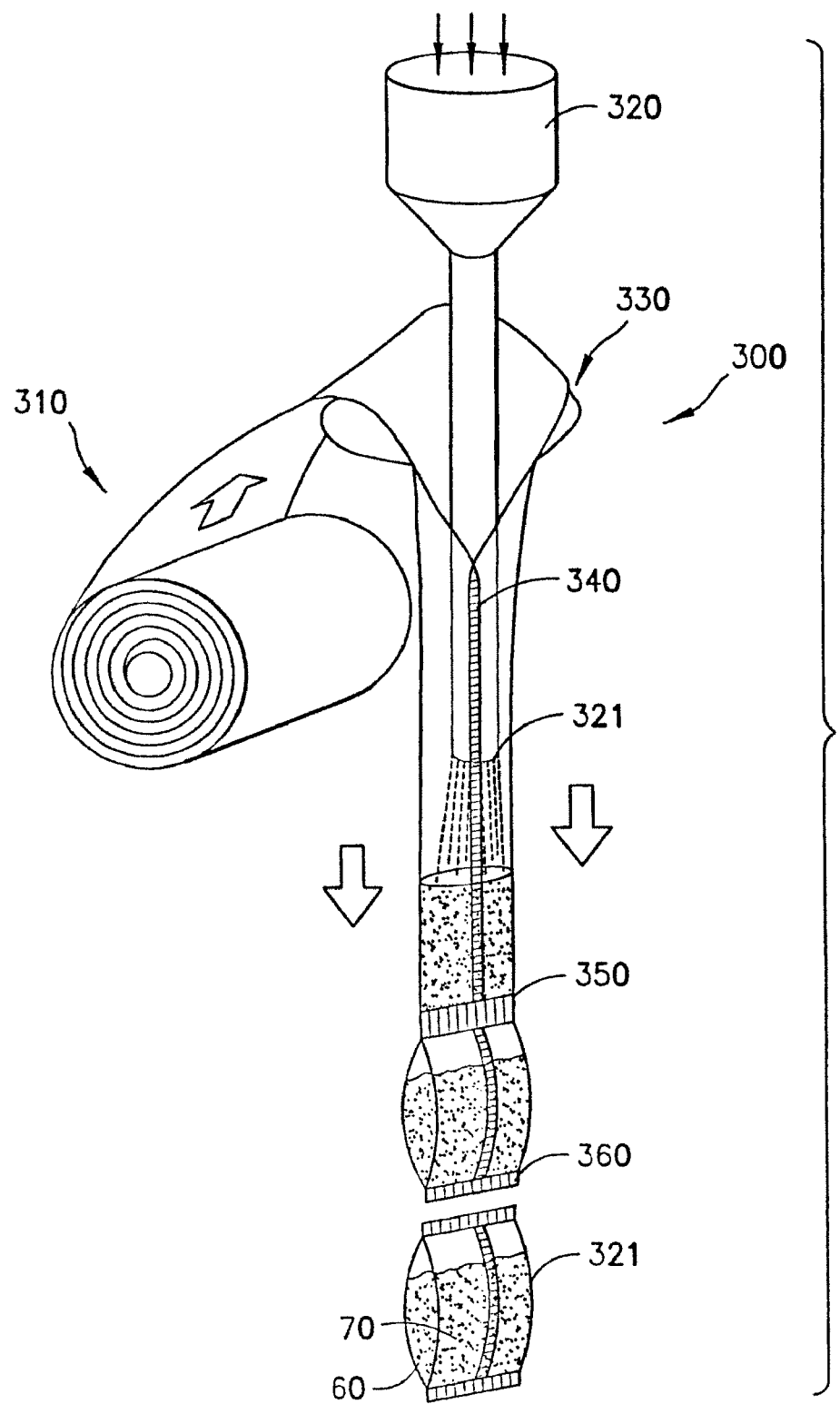
FIG. 26 is a fluid bag filling and sealing device in accordance with the present invention.

A fluid bag filling and sealing method and system 300, in accordance with an embodiment of the invention, is illustrated in FIG. 26. Bag material 310, which may be formed of any suitable material as described above, is stored in bulk form, such as, for example, in roll form. As the process continues, bag material 310 is moved over bag forming portion 330 such that the generally flat shape of bag material 310 is formed into a tube. As the process continues, a vertical seal device 340 forms a vertical seal in bag material 310, thus completing the formation of a tube.

Contents supply portion 320 serves to add ingredients, via, for example, gravity feed, into the tube of bag material 310. Contents supply portion 320 may include liquid and powder storage containers, and various pumps and other supply means, such that, for example, fluid 70, either with or without any additives as discussed above, may be added and metered out in appropriate quantities as is known in the art. Additionally, contents supply portion 320 may include heating and/or sterilizing equipment such that the contents supplied from contents supply portion 320 are in a generally sterilized condition.

Next, horizontal seal device 350 forms a horizontal seal, either thermally, by adhesives, or by some other art recognized method as would be known to one skilled in the art. The horizontal seal serves to isolate the contents of the tube into separate portions. Next, the bag cutting device cuts the bag material at the horizontal seal to form individual fluid bags 60 containing fluid 70.

Of course, in accordance with the spirit of the invention, the exact steps taken to form the fluid bags 60 may be varied as a matter of application specific design choice. In some embodiments of the invention, steps may be added, left out, or performed in a different order. Additionally, the contents and bag material 310 of fluid bags 60 may be sterilized either before or after the completed bags are formed.

Figure 27:
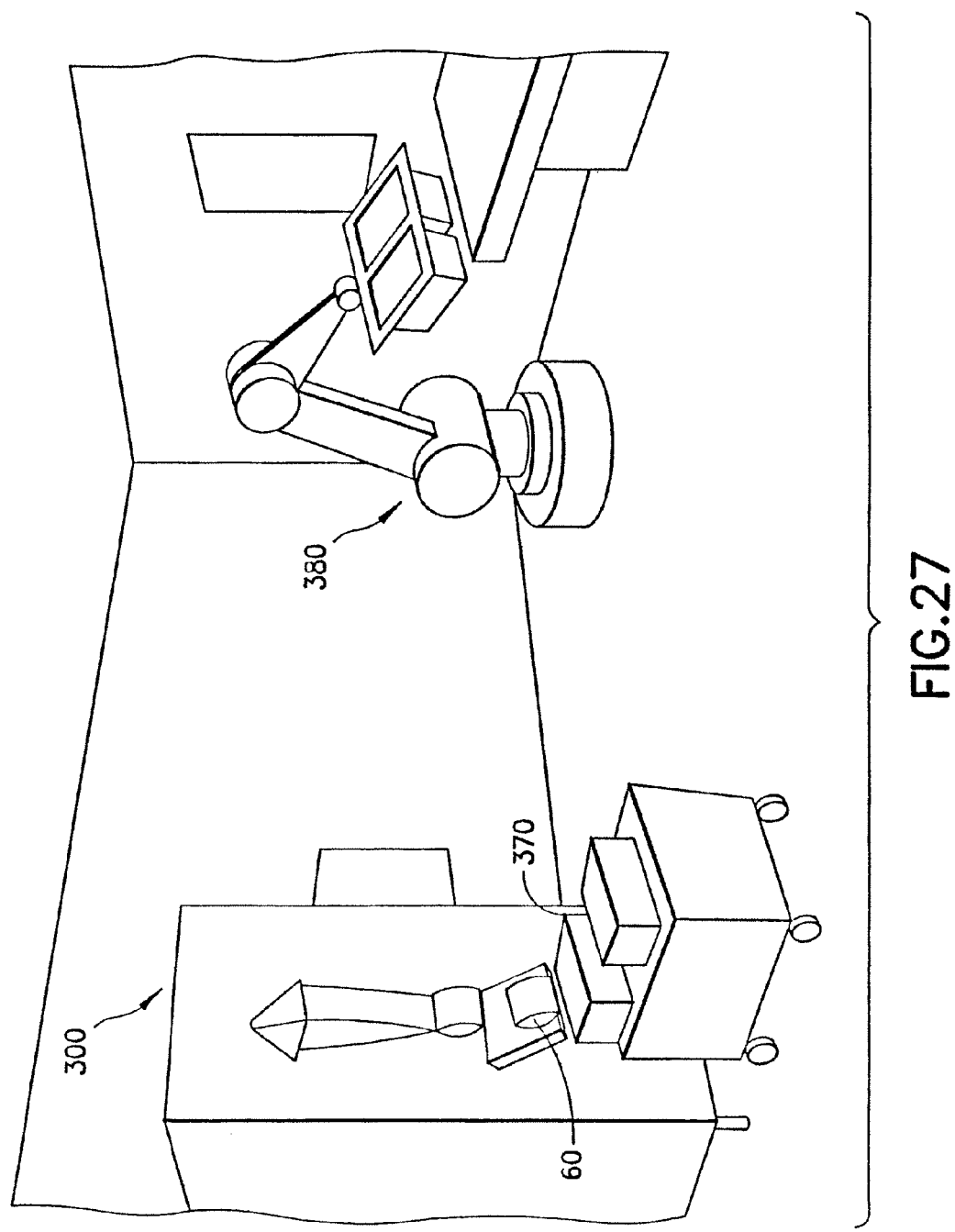
FIG. 27 is a view of a fluid bag preparation room in accordance with the present invention.
Figure 28:
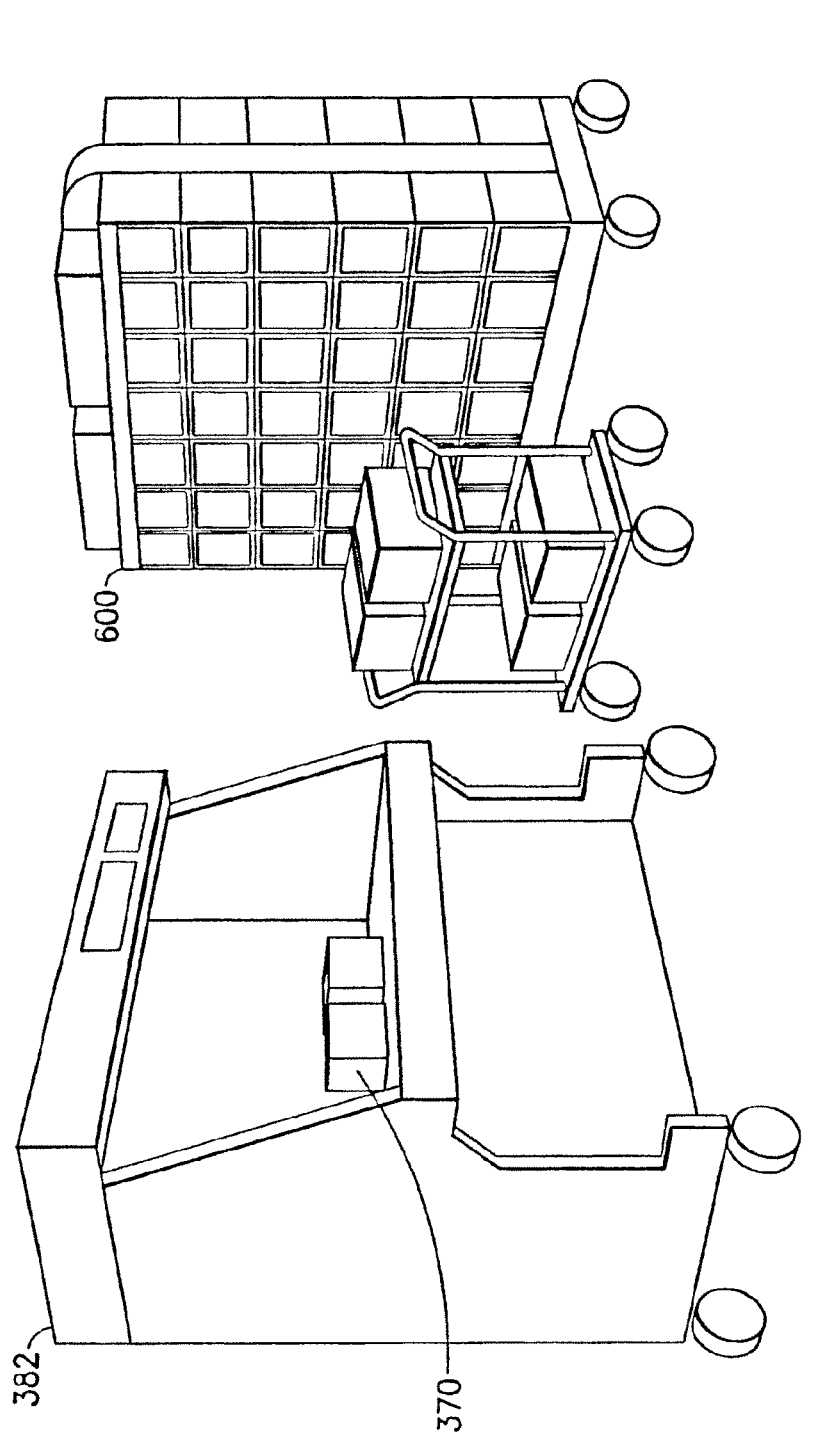
FIG. 28 is another view of a fluid bag preparation room in accordance with the present invention.
Figure 29:
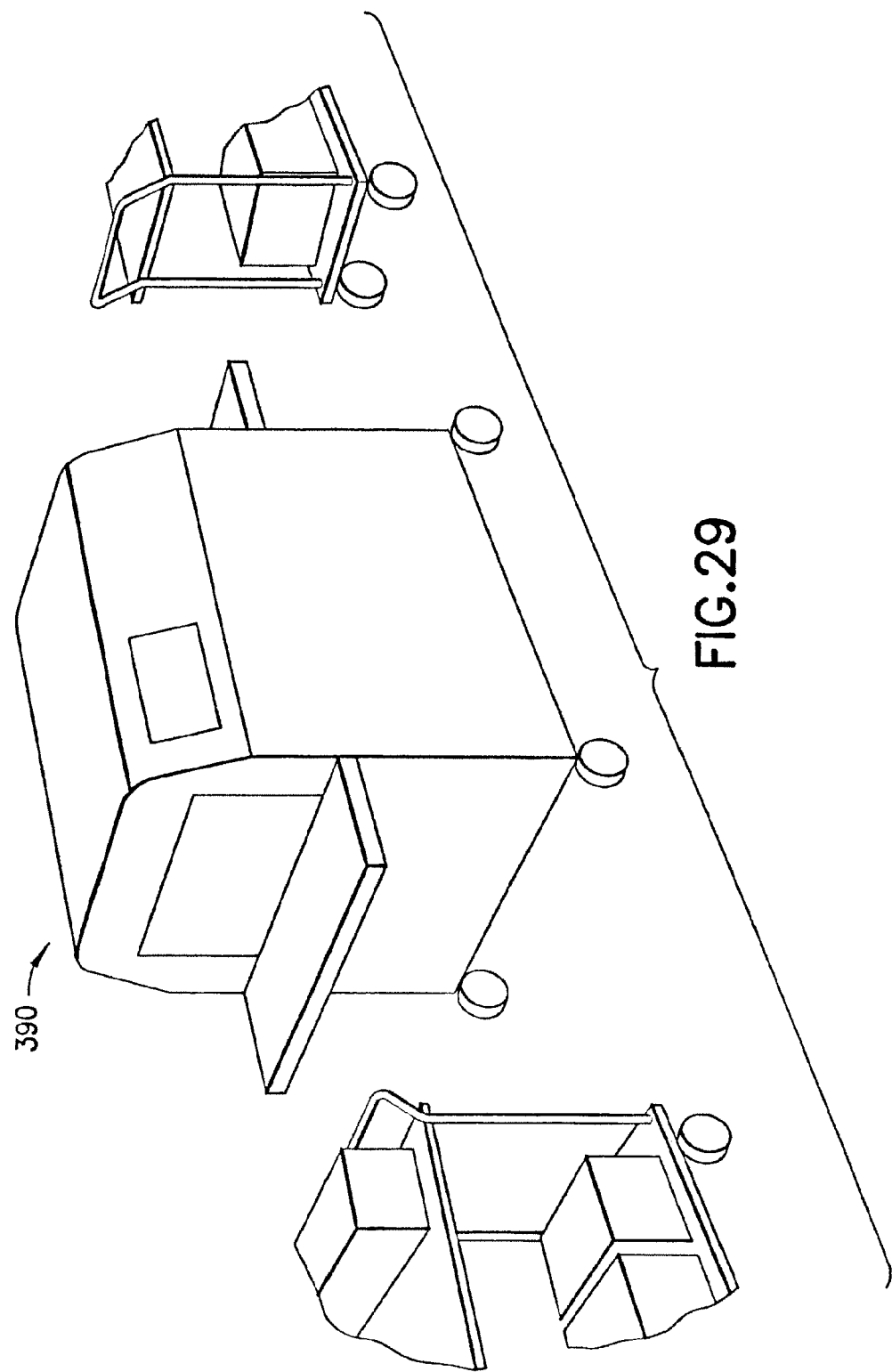
FIG. 29 is another view of a fluid bag preparation room in accordance with the present invention.

In an embodiment of the invention, and with reference to FIGS. 27-29, the fluid 70 is heated to approximately 180° F., and the fluid bags are stacked in storage containers 370 with the result that the fluid 70, fluid bags 60 and storage containers all become sterilized to a satisfactory degree. In an embodiment of the invention, a cage body 98 may be used as such a storage container. Additional parts of this process may also be automated, as is shown by the use of robotic arm 380 in stacking containers.

Storage containers 370 (or cage bodies 98) may also be supplied with fluid bags 60 at a workstation 382, before placement in a isolation and caging rack system 600. Additionally, storage containers 370 (or cage bodies 98) may be passed through various other sterilizing devices.

Figure 30:
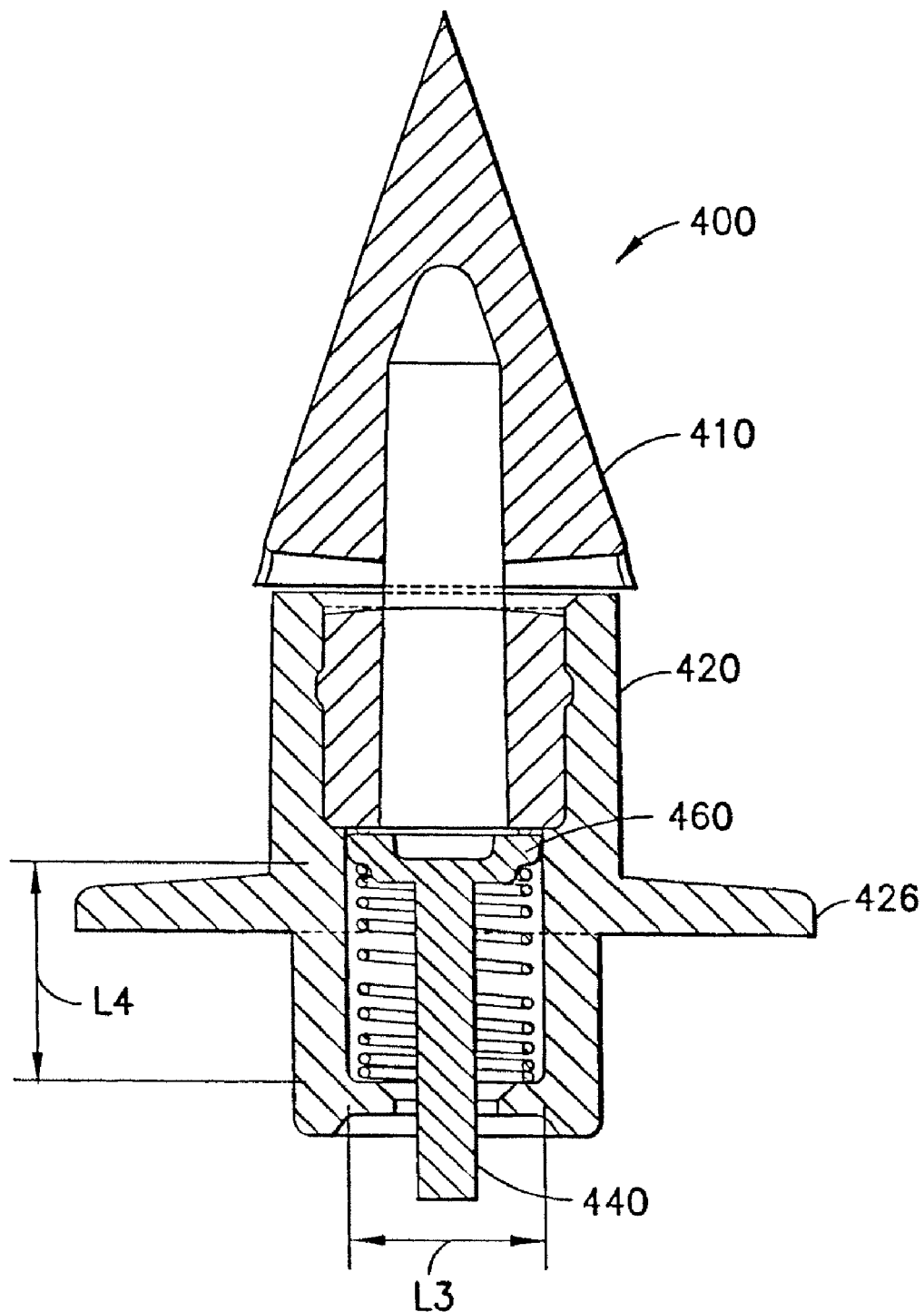
FIG. 30 is a side cutaway view of an exemplary embodiment of a fluid delivery valve assembly.

With reference to FIG. 30, there is shown another embodiment of a fluid delivery valve assembly 400, which, as can be seen, is similar in many respects to fluid delivery valve assembly 200, described above. Through experimentation, it was found that an actuation force of 3 grams or less was optimal for allowing animals to obtain fluid from the valve assembly 400 efficiently and effectively. As described above with respect to fluid delivery valve assembly 200, the actuation force of actuating stem member 440 is related to the length of actuation portion 442 of stem member 440 (which acts as a lever as the top surface 443 of stem member 440 pivots upon sealing member 460), and the characteristics of spring member 450, which applies biasing force against stem member 440. To achieve this desired actuation force requirement, experiments were performed using various dimensions of the spring 460 (discussed below), base fluid channel 430, and stem member 440. Dimensions, for certain embodiments, were as follows: The width L3 of base fluid channel 430 was dimensioned to be about 0.205 in. The length of base fluid channel L4 (measured to the bottom of sealing member 460) was dimensioned be optimal about 0.300 in.

Figure 31:
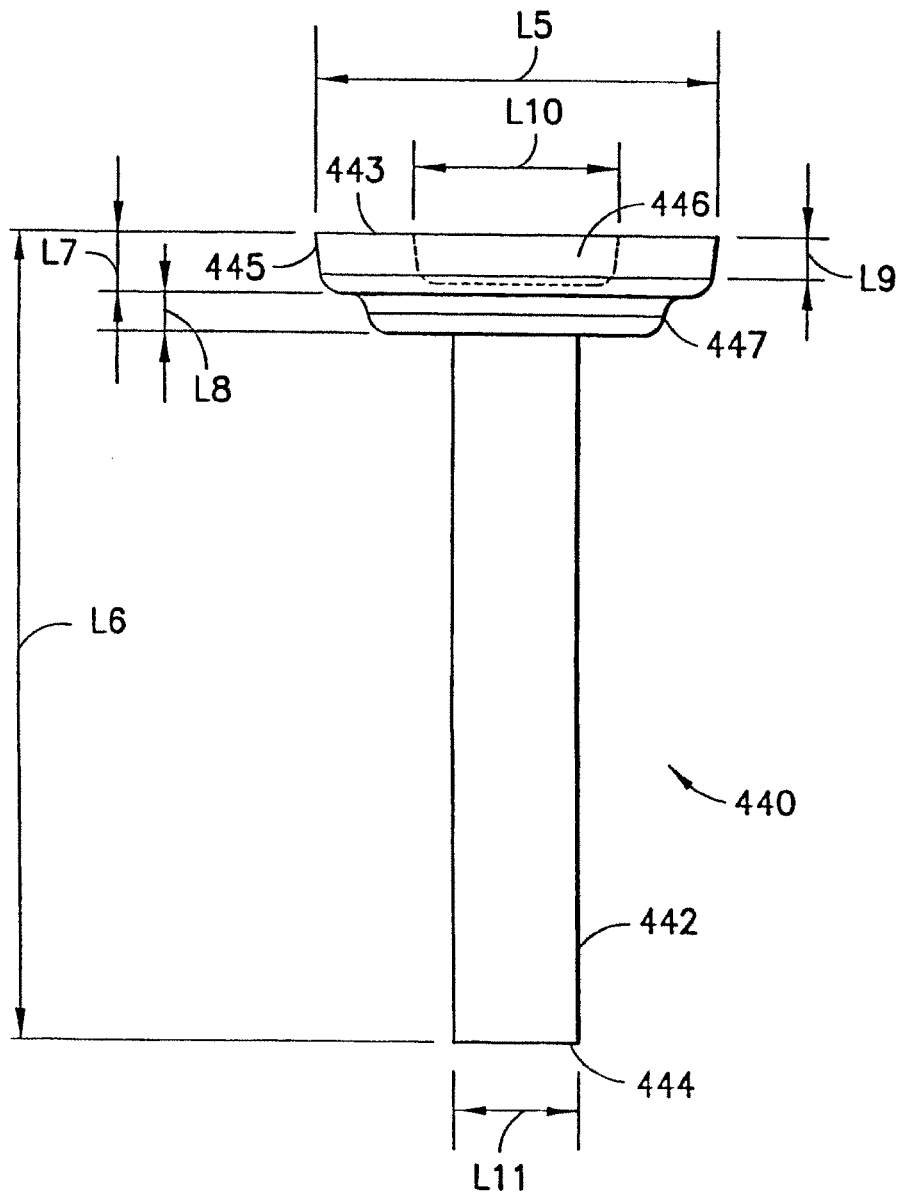
FIG. 31 is a side cutaway view of an exemplary embodiment of a stem of a fluid delivery valve assembly.

With reference to FIG. 31, various dimensions with respect to stem member 440 were found to be beneficial. For example, the width L5 of top surface 443 of stem member 440 was dimensioned to be about 0.200 in. The length L6 of stem member 440 was dimensioned to be about 0.420 in. The height L7 of edge 445 of stem member 440 was dimensioned to be about 0.030 in. The thickness L8 of extension 447 of stem member 440 was dimensioned to be about 0.020 in. The depth L9 of stem cavity 446 was dimensioned to be about 0.025 in. The width L10 of stem cavity 446 was dimensioned to be about 0.100 in. Finally, the width L11 of actuation portion 442 of stem member 440 was dimensioned to be about 0.062 in.

Figure 32:
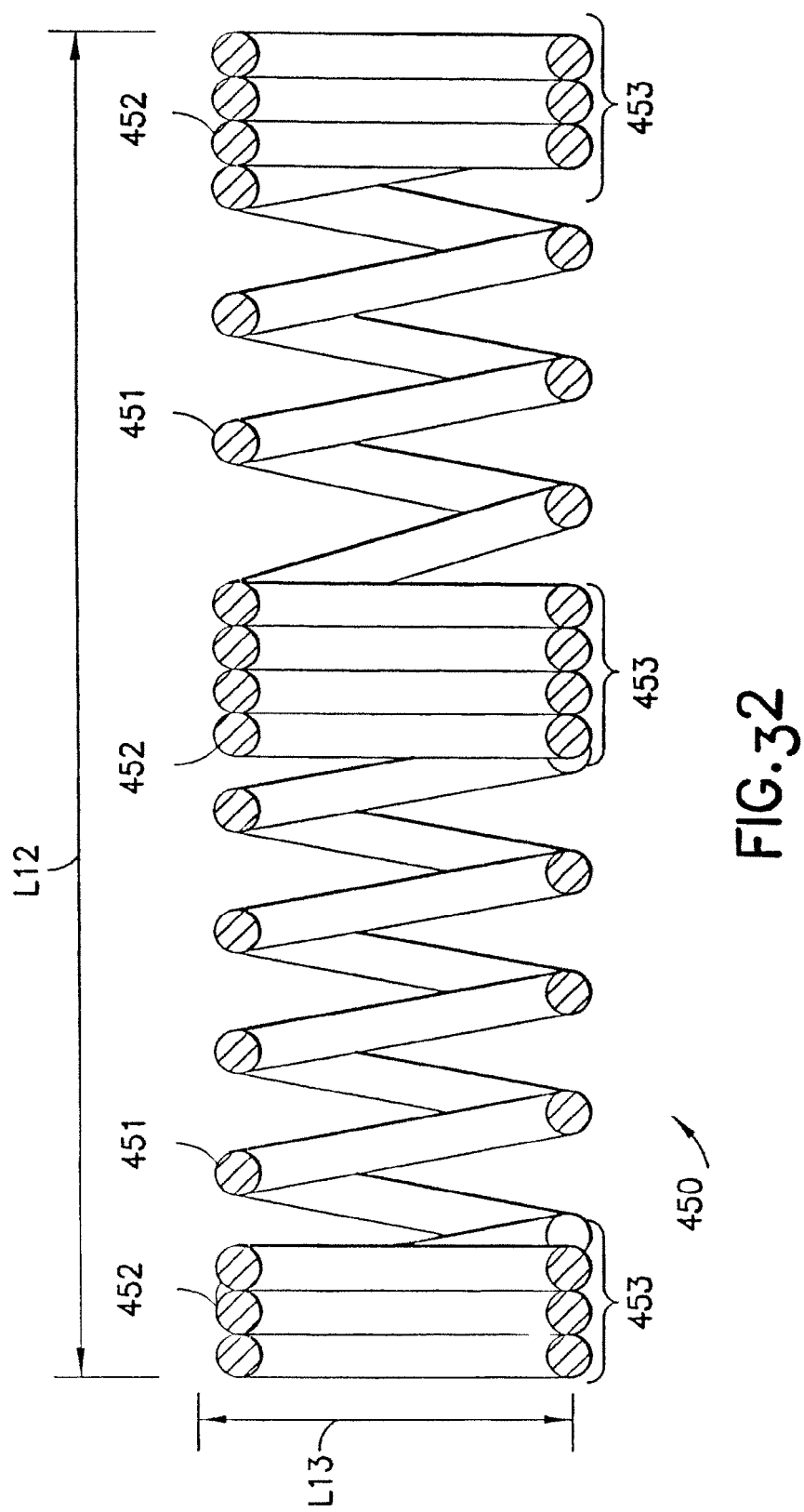
FIG. 32 is an exemplary representational side view of a spring member for a fluid delivery valve assembly.

With reference to FIG. 32, there is illustrated an exemplary embodiment of spring member 450. Spring member 450 can be formed from 302 stainless steel wire with nickel coating, the wire having a diameter of 0.011 in. Outer diameter L13 can be about 0.188 in., and spring member 450 can have a free length L12 (length with no applied force) of 0.350 in. The load (or force generated by spring member 450) when compressed to a length of 0.255 in. (the approximate length of spring member 450 when housed within fluid delivery valve assembly 400) is 22.3 grams, within a range of plus or minus 3.5 grams. Of course, while certain embodiments have components dimensioned within the above limits, other dimensions may also be used, in accordance with the teachings herein. In certain embodiments, spring member 450 can have a total of about 19.4 coils, with about 6.4 of the coils being active, and about 13.4 of the coils being "dead coils."

Active coils 451 are coils that are free to deflect under a load. In contrast, a dead coil 452 is a coil of wire which does not contribute to the motive force of a spring. Generally, in extension and torsion springs, there are no dead coils. Typically, in compression springs, such as spring member 450, the coils at each end that lay against each other are dead coils, with the rest being active coils. In certain embodiments, however, additional dead coils 452 are employed to facilitate the assembly process. Specifically, because of the relatively small dimensions of spring member 450, the spring members 450 tend to nest and tangle when piled or grouped together as the active coils tend to become intertwined.

In certain embodiments, however, dead coils 452 are advantageously employed to minimize the tangling of the spring members 450 during storage and assembly. In certain embodiments, groups 453 of dead coils 452 are positioned at various locations on spring member 450. In one embodiment, a group 453 of about 4.5 dead coils 453 is located at each end of spring member 450 and another grouping 453 of 4.5 dead coils 452 is located at the middle of spring member 450. Because the coils in the groupings 453 of dead coils 452 are positioned close together, coils from adjacent spring members 450 do not penetrate between the coils and the spring members 450 are less likely to tangle when piled or stored prior to assembly in fluid delivery valve assembly 400. In addition, the combination of spring member 450 dimensions described, in combination with the various dimensions described above with respect to stem member 440 and base 420 have been found to provide for a valve with an actuation force of 3 grams or less.

To facilitate production of large quantities of fluid delivery valve assemblies 400, certain components, such as, for example, upper member 410, base 420 stem member 440, and sealing member 460, can be formed by way of an injection molding process. Generally, injection molding is the process of forcing melted plastic into a mold cavity. Once the plastic has cooled, the part can be ejected. With this process, many parts can be made at the same time, out of the same mold.

Figure 33:
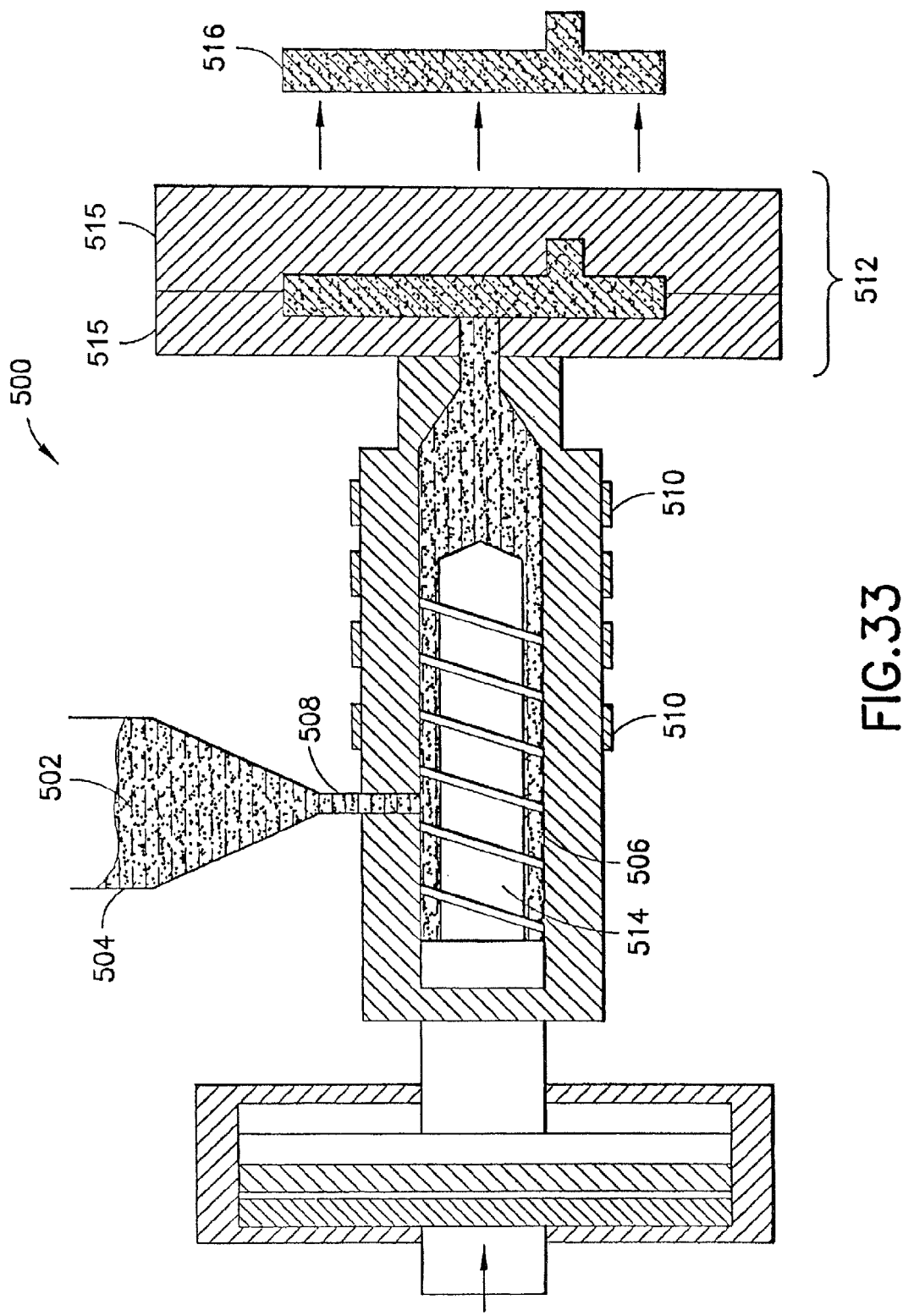
FIG. 33 is an exemplary schematic diagram of an injection molding machine for forming portions of a fluid delivery valve assembly.

With reference to FIG. 33, an exemplary injection molding apparatus 500 in accordance with certain embodiments is shown. In the injection molding process, resin 502 is fed to the apparatus through the hopper 504. The resins enter the injection barrel 506 by gravity though the feed throat 508. Upon entrance into the barrel 506, the resin 502 is heated by heating elements 510 to the appropriate melting temperature.

The resin 502 is injected into the mold 512 by a reciprocating screw 514 or a ram injector. The reciprocating screw offers the advantage of being able to inject a smaller percentage of the total shot (amount of melted resin in the barrel). Typically, a screw 514 injector is better suited for producing smaller parts. The resin is moved through a runner to the outlet, or gate, and then into the mold cavity. The gate provides the connection between the runner and the molded part.

The mold 512 receives the plastic and shapes it appropriately. The mold is cooled to a temperature that allows the resin to solidify and be cool to the touch. The mold plates 515 are held together by hydraulic or mechanical force. After sufficient part cooling, the mold is opened and the part 516 is ejected.

The characteristics of the injection molded part are affected by three main categories of parameters: material parameters; geometry parameters; and manufacturing parameters. Material parameters include, among others, the viscosity of the material used and its associated pressure-volume-temperature behavior. Relevant geometry parameters include, among others, the wall thickness of the part, the number of gates from which the melted material passes into the mold, and the thickness of the gates. Some of the relevant manufacturing parameters include, among others, the mold temperature, the melt temperature of the material, and the pressure applied to the mold. The performance of an injection-molded part is dependent on the interaction of these groups of parameters, as would be understood by one of ordinary skill in the art, as instructed by the disclosure herein.

In addition, while an embodiment of fluid delivery valve assembly 200 has been described herein as comprising a separate sealing member 260, and piercing member 210, these components can also be formed as a single component comprising sealing member 460 and upper member 410 integrally formed as a single component. Such an integrally formed component may be made by way of a multi-step molding process.

Multi-step molding (or two-shot molding) requires a machine with two independent injection units, each of which injects a different material. The first material is injected through a primary runner system by a piston, as in a typical injection molding cycle. During this injection, the mold volume to be occupied by the second material is shut off from the primary runner system. The second runner system is then connected to the volume to be filled and the second material is injected. After sufficient part cooling, the mold is opened and the part is ejected.

Figure 34:
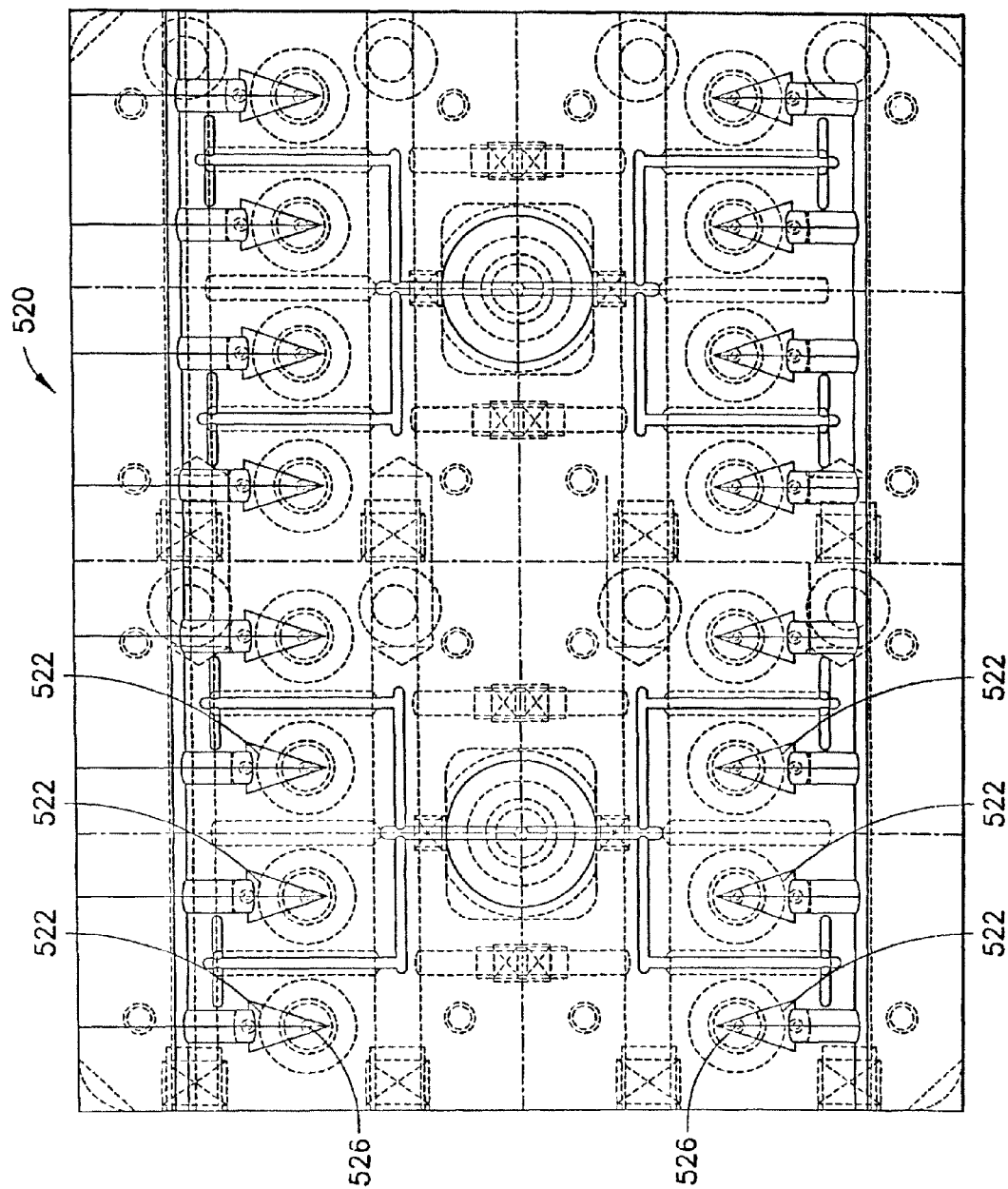
FIG. 34 is a plan view of an exemplary mold for injection molding components of a fluid delivery valve assembly.
Figure 35:
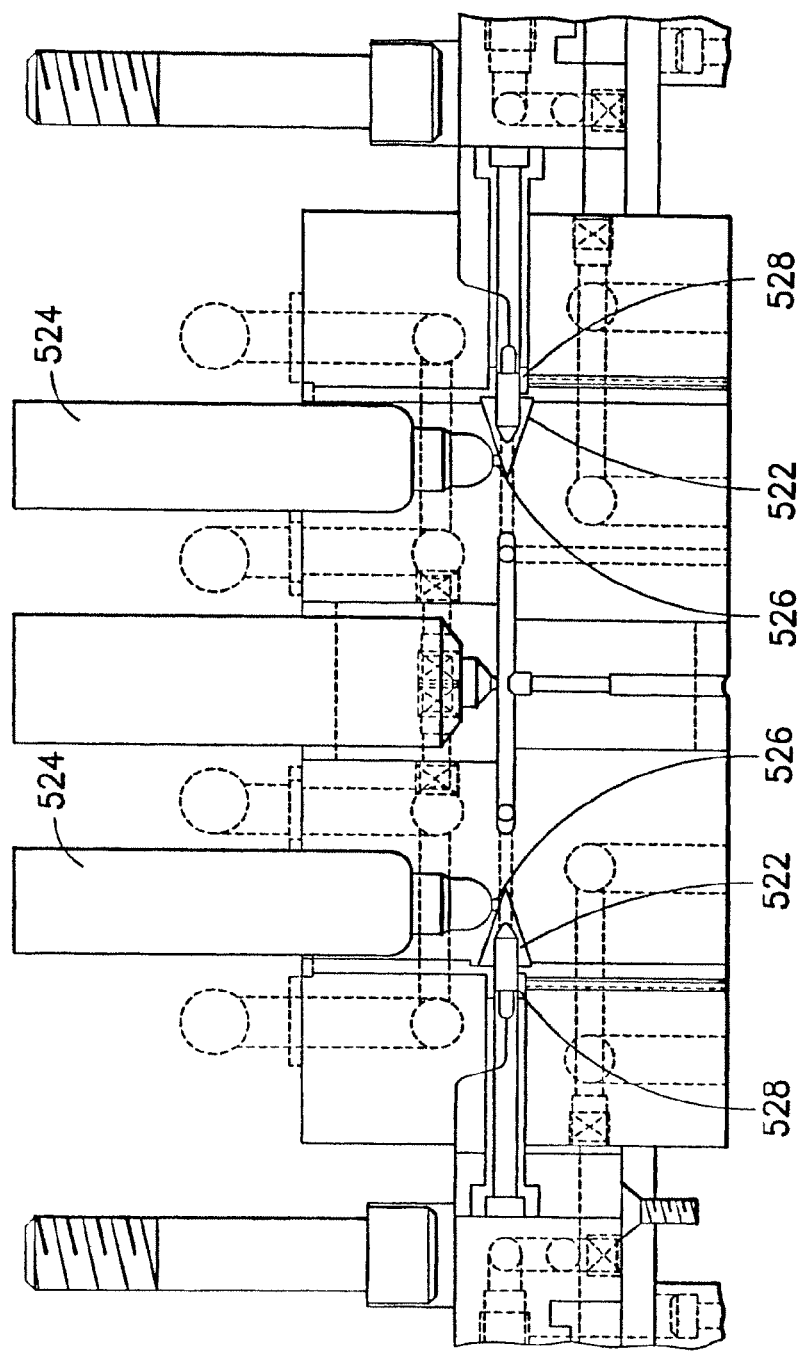
FIG. 35 is a cross-sectional elevational view of the mold of FIG. 34.

With reference to FIGS. 34 and 35, there is shown in FIG. 34 a plan view, and in FIG. 35, an elevation view of an exemplary mold 520 for integrally formed upper member 410 and sealing member 460. The mold 520 contains a plurality of cavities 522 in which the integral upper member 410 and sealing member 460 can be formed. The mold 520 is heated to a predetermined temperature, and a first material, in certain embodiments, polypropylene, is injected through the primary runner system 524 and out the primary gates 526 into the cavities 522 to form the upper member 410 portion of the integral component.

Next, a cylinder at each cavity is retracted, thus opening a small secondary cavity 528 in the shape of sealing member 460. Next, a second material, in certain embodiments, silicone rubber, is injected through a secondary runner system into secondary cavity 528. As the materials cool, the upper member 410 and the sealing member 460 portion can, in certain embodiments, become chemically bonded. Next, the mold 520 components are separated and the integrally formed upper member 410 and the sealing member 460 components are ejected from the mold 520.

Figure 36:
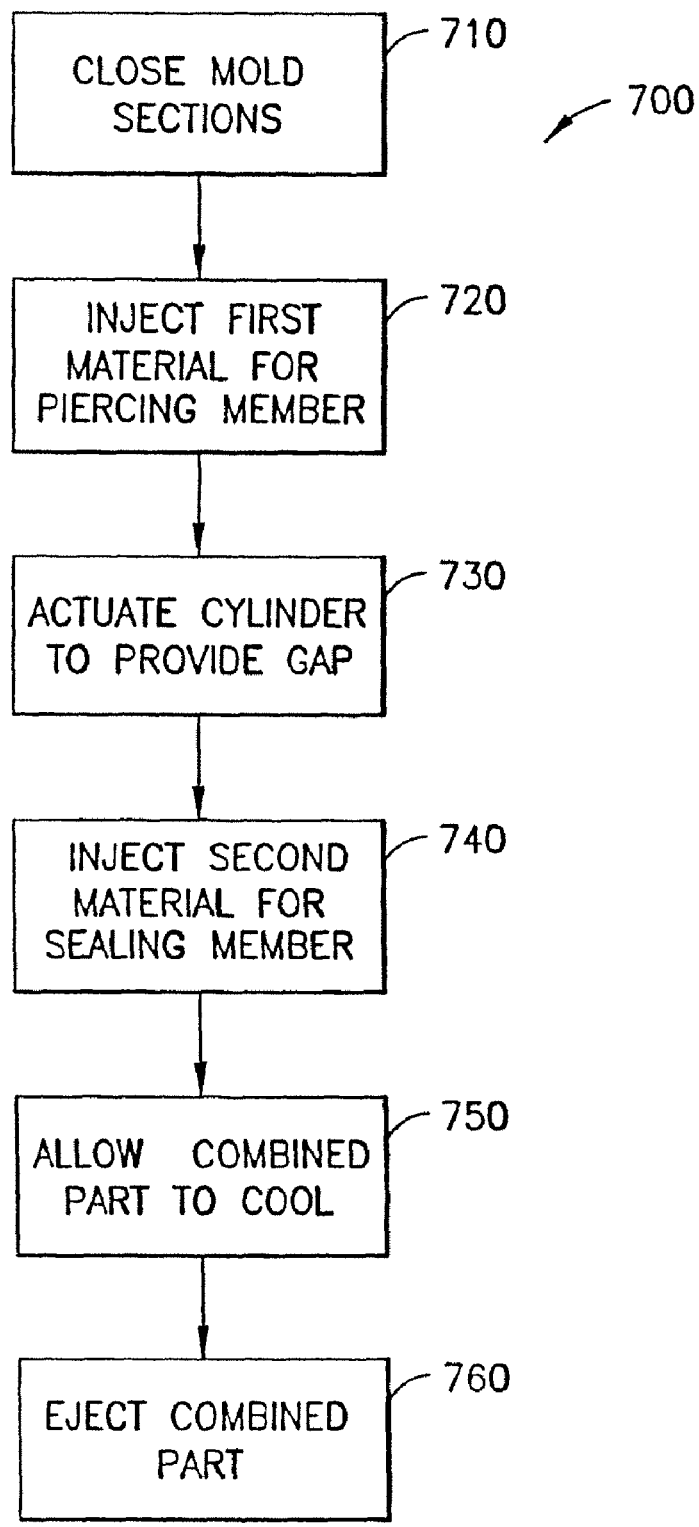
FIG. 36 is an exemplary flow diagram illustrating portions of a process for multi-step injection molding parts of a fluid delivery valve assembly.

With reference to FIG. 36, portions of the multi-step molding process 700 for the upper member 410 and sealing member 460 are described. First, the mold sections are closed. Step 710. Next, the first material is injected into the primary cavity, forming the upper member 410 portion. Step 720. Next, a cylinder is actuated and retracted, thus creating a secondary cavity in the shape of sealing member 460. Step 730. Next, the second material is injected into the newly formed secondary cavity, thus forming the sealing member 460 portion. Step 740. The combined integral component is then allowed to cool, the first and second materials forming a chemical bond. Step 750. Finally, the combined component is ejected from the mold.

Accordingly, by way of this multi-step injection molding process, the upper member 410 can be integrally formed with sealing member 460, thus resulting in one less separate component during the valve assembly process. In certain embodiments, the base 420 and stem member 440 are also formed by injection molding. In addition, by having sealing member 460 integrally formed with upper member 410, the chances of sealing member 460 being misaligned during the assembly process are greatly minimized, thus providing for a larger amount of properly assembled valves. Further, by forming components of fluid delivery valve assembly 400 via injection molding, relatively large amounts of these components fluid delivery valve assemblies 400 can be produced, within precision tolerances, and with a relatively low failure rate.

Moreover, a benefit of forming the fluid delivery valve assembly 400 by way of a multi-step injection molding process is that the fluid delivery valve assemblies 400 can be made relatively quickly, and inexpensively. In addition, the use of a spring having strategically place dead coils, thus preventing nesting of the springs during the manufacturing process, also contributes to the ability for the methods described herein to result in the manufacturing of a relatively inexpensive valve. Accordingly, because the fluid delivery valve assembly 400 is inexpensive, it is thus disposable. As such, the benefits of a disposable valve, such as no need for washing before reuse (because the valve assembly 400 is typically discarded after use), may be realized.

Thus, while there have been shown and described and pointed out fundamental novel features of the invention as applied to exemplary embodiments thereof, it would be understood that various omissions and substitutions and changes in the form and details of the disclosed invention may be made by those skilled in the art without departing from the spirit of the invention. It is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall there between.

What is claimed is:

1. A method of assembling a valve assembly for delivering a fluid from a fluid bag to an animal caging system for housing an animal, the method comprising:
    coupling an upper member having a piercing member to a base having a base fluid channel defined therethrough;
    disposing a stem member at least partially within the base fluid channel, the stem member having an actuation portion and a top portion having a lower surface;
    injection molding a sealing member in the base fluid channel so that the sealing member is secured to the upper member during the injection molding of the sealing member to form a unitary structure, the sealing member having a flow aperture and a sealing member bottom surface to facilitate sealing of the flow apertures when the sealing member bottom surface abuts a top surface of the stem member,
    disposing a spring element within the base fluid channel, wherein a portion of the spring element abuts the lower surface to apply a biasing force to the stem member.

2. The method of claim 1, wherein the spring element comprises at least one group of dead coils, thereby facilitating prevention of a tangling of a plurality of spring members when the spring members are arranged during the assembly process.

3. The method of claim 1, wherein the spring element comprises at least three groups of dead coils, at least one of the groups being located at the center of the spring element, at least one of the groups being located at a first end of the spring element, and at least one of the groups being located at a second end of the spring element.

4. The method of claim 1 wherein the sealing member bottom surface has a lower ridge extending therefrom, the lower ridge being constructed and arranged to facilitate the concentration of the biasing force from the spring member to seal the flow aperture.

5. The method of claim 1, wherein the stem member is constructed and arranged to selectively facilitate the flow of the fluid when the actuation portion is pushed.

6. The method of claim 1, wherein the stem member is constructed and arranged to selectively facilitate the flow of the fluid when the actuation portion is pushed with a force of less than or equal to 5 grams.

7. The method of claim 1, wherein the stem member is constructed and arranged to selectively facilitate the flow of the fluid when the actuation portion is pushed with a force of less than or equal to 3 grams.

* * * * *